United States Patent
Steketee, Jr.

[11] Patent Number: 6,089,275
[45] Date of Patent: Jul. 18, 2000

[54] REPLACEMENT PIPE FOR INSTALLATION IN AN EXISTING CONDUIT

[75] Inventor: Campbell H. Steketee, Jr., Salem, Oreg.

[73] Assignee: INA Acquisition Corp., Wilmington, Del.

[21] Appl. No.: 08/421,463

[22] Filed: Apr. 12, 1995

Related U.S. Application Data

[63] Continuation of application No. 08/010,522, Jan. 25, 1993, abandoned, which is a continuation of application No. 07/808,305, Dec. 16, 1991, abandoned, which is a continuation of application No. 07/180,904, Apr. 13, 1988, abandoned, which is a continuation-in-part of application No. 07/076,973, Jul. 28, 1987, Pat. No. 4,867,921, which is a continuation of application No. 06/846,322, Mar. 31, 1986, abandoned.

[51] Int. Cl.[7] .................................................. F16L 55/162
[52] U.S. Cl. .............................. 138/98; 138/97; 138/137; 138/DIG. 6
[58] Field of Search ............................... 138/97, 98, 137, 138/140, 110, DIG. 6; 264/36, 210.1, 230, 267, 269, 280, 285, DIG. 6; 156/200, 201, 214; 29/523

[56] References Cited

U.S. PATENT DOCUMENTS

| | | | |
|---|---|---|---|
| 2,204,785 | 6/1940 | Bennett | 264/269 |
| 2,789,934 | 4/1957 | Busbach | 264/269 |
| 3,201,861 | 8/1965 | Fromson et al. | 138/119 |
| 3,487,574 | 1/1970 | Lööf | 138/119 |
| 4,207,130 | 6/1980 | Barber | 138/97 |
| 4,723,579 | 2/1988 | Hyodo et al. | 138/98 |
| 4,867,921 | 9/1989 | Steketee | 138/98 |

FOREIGN PATENT DOCUMENTS

| | | | |
|---|---|---|---|
| 2503622 | 10/1982 | France | 264/269 |
| 2728056 | 1/1979 | Germany . | |
| 0106925 | 8/1979 | Japan . | |

Primary Examiner—James Hook
Attorney, Agent, or Firm—Cowan, Liebowitz & Latman, P.C.; Michael I. Wolfson; Lloyd G. Buchanan

[57] ABSTRACT

A form of folded thermoplastic pipe is disclosed for use in repairing a pipeline. Also disclosed are methods and apparatuses especially for installing the thermoplastic pipe in an existing underground pipeline, such as a service lateral, having access from only one end and a bend along its length. The thermoplastic pipe is manufactured in folded form so as to have a folded memory, and spooled for storage in such form. The folded pipe is reheated to make it pliable for installation, and is pulled into the lateral from the access opening using a cable-and-pulley arrangement anchored temporarily at the intersection of lateral and main pipelines. When the folded pipe is installed in the lateral, it is rounded and cured in its rounded shape by passing steam under pressure through passages along the folds of the pipe while its leading end is restricted. The leading end may be restricted by an end clamp which enables a hot fluid to pass completely through the pipe and thus heat it full length, or by an inflatable plug. The inflatable plug may be folded within the thermoplastic pipe before the pipe's insertion and then inflated to plug the leading end of the new pipe after its insertion. Alternatively, the inflatable plug may be propelled to the leading end of the new pipe after its insertion and then fully inflated to block such end and thereby enable full rounding and expansion of the remainder of the new pipe.

10 Claims, 8 Drawing Sheets

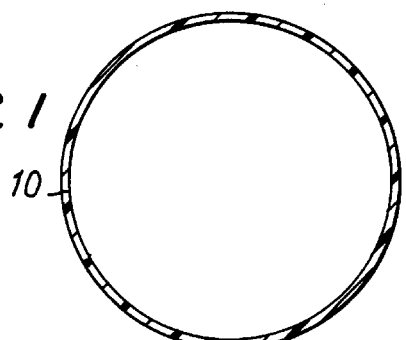
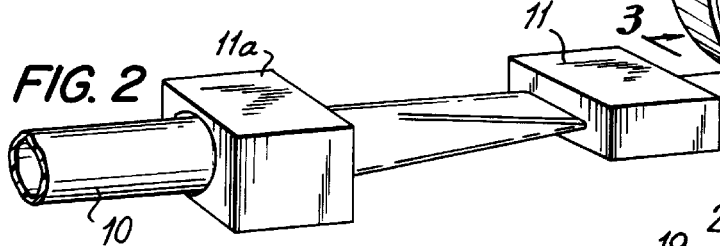
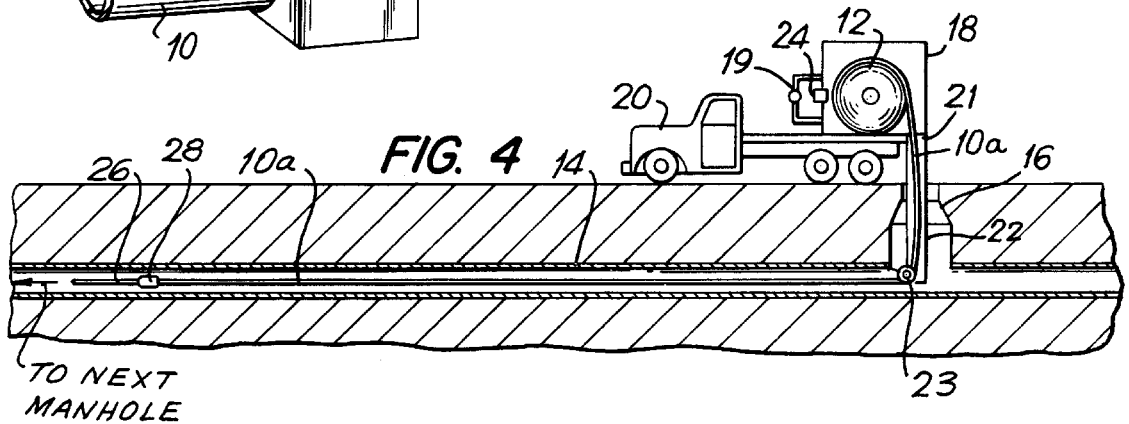
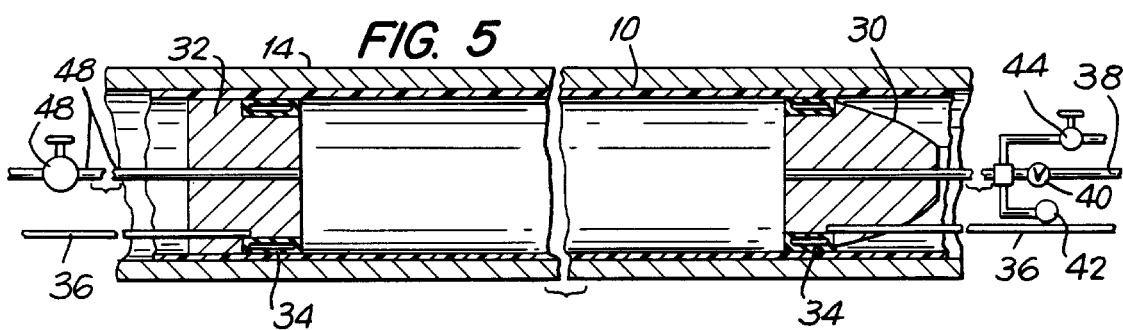
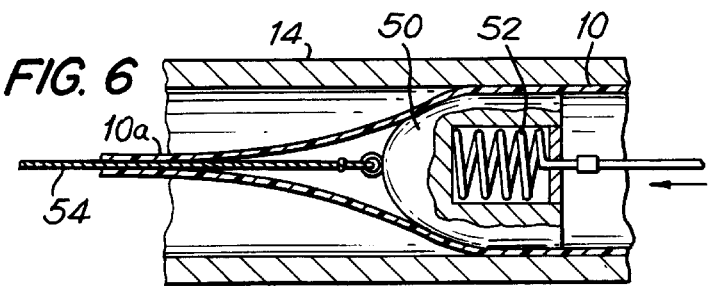

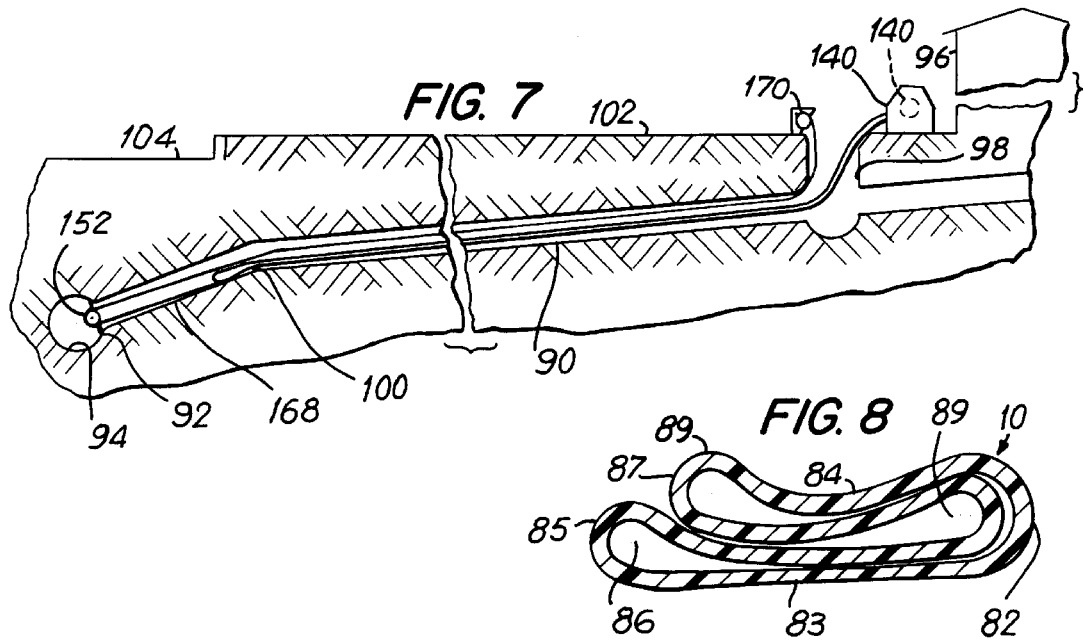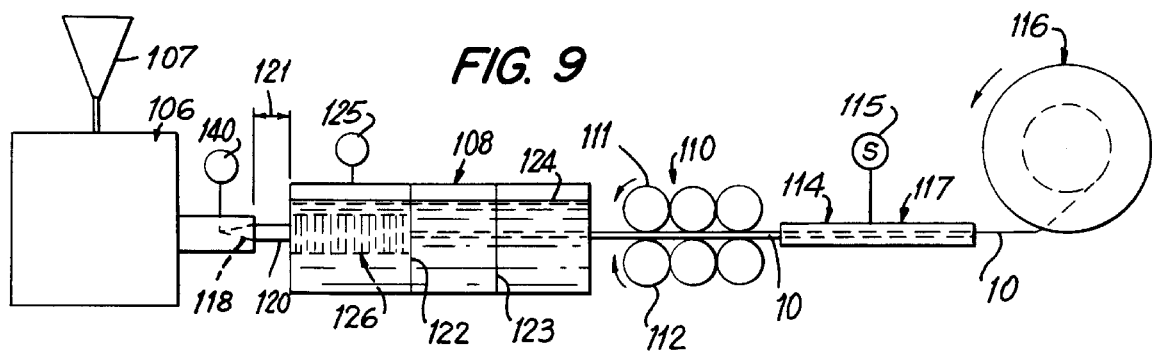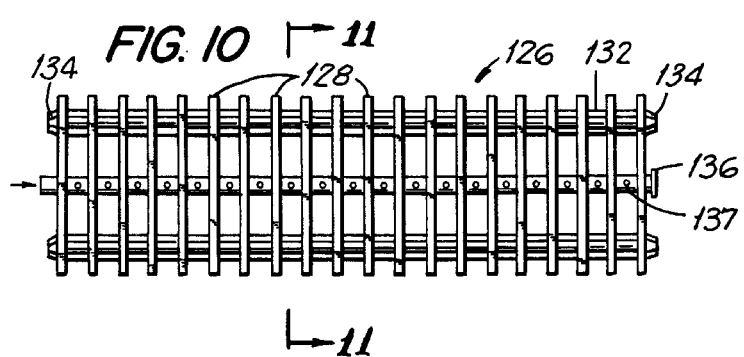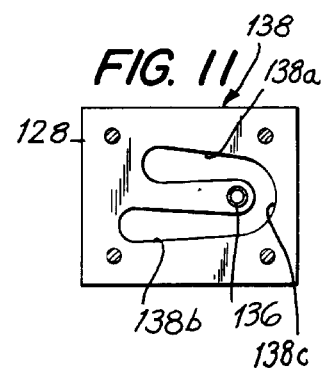

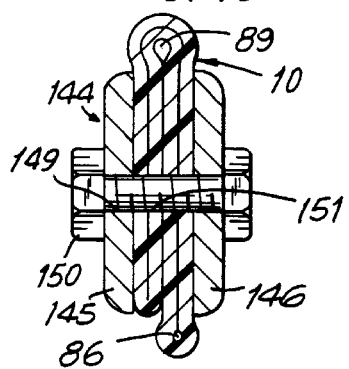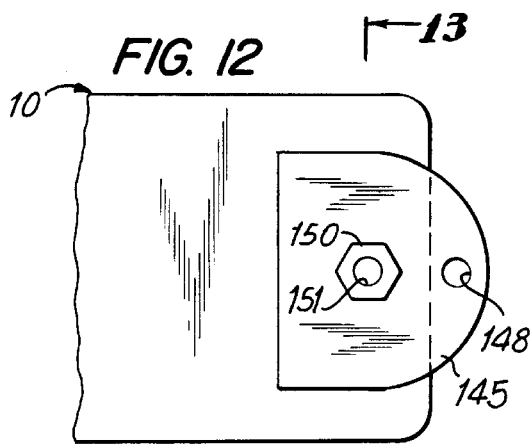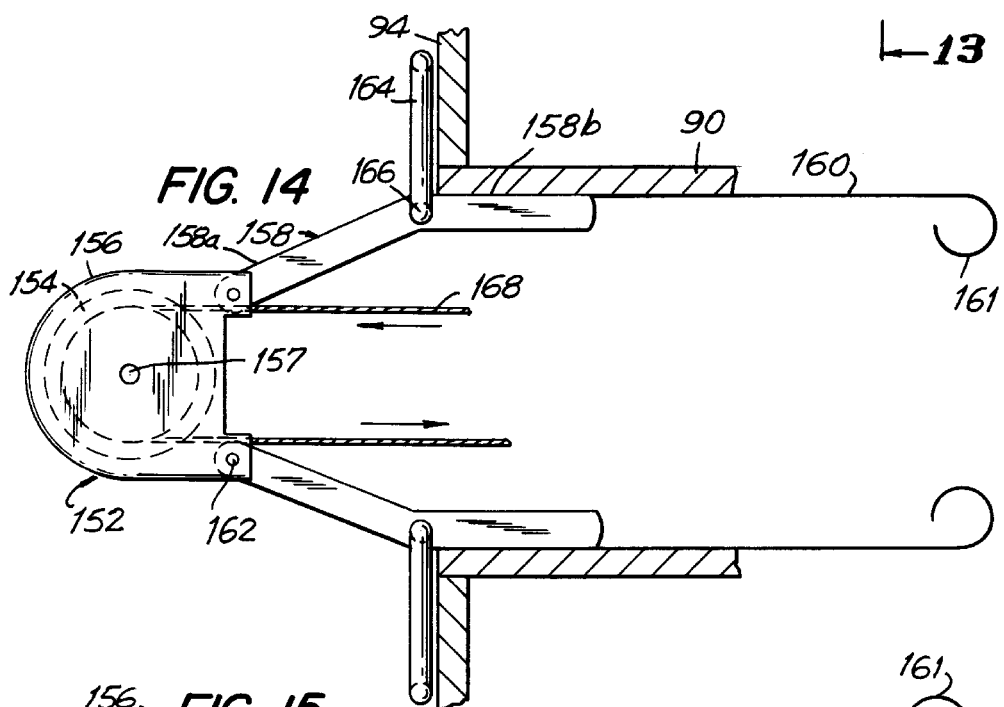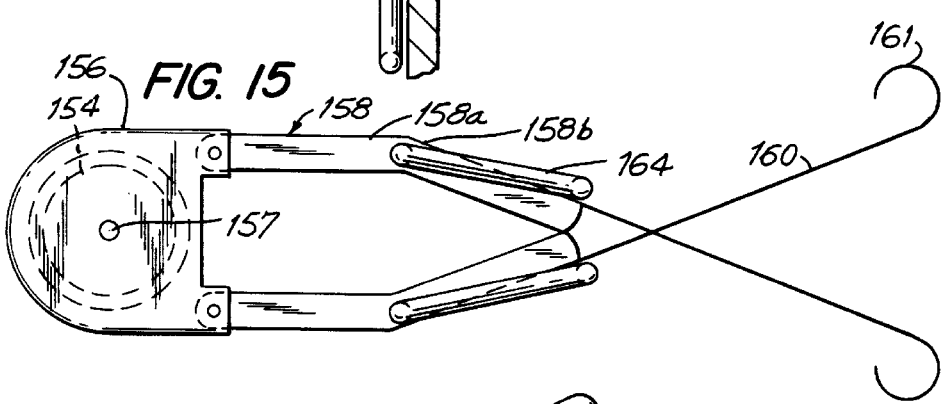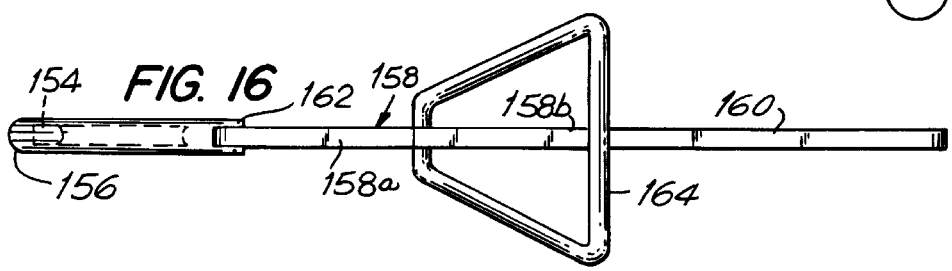

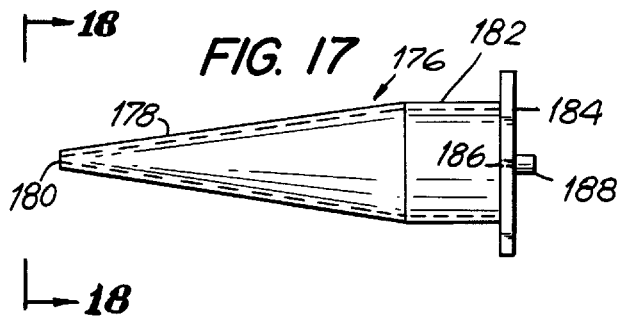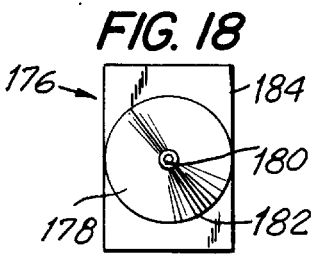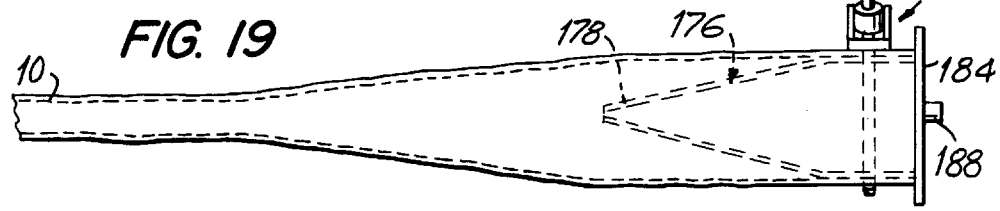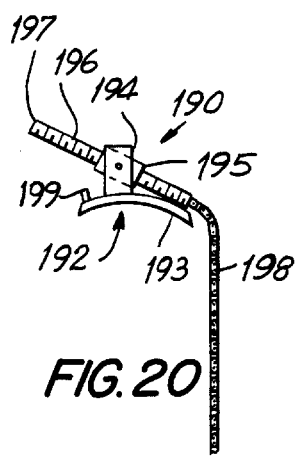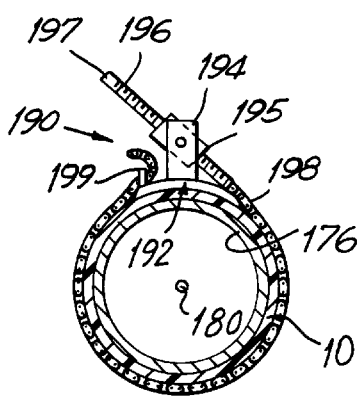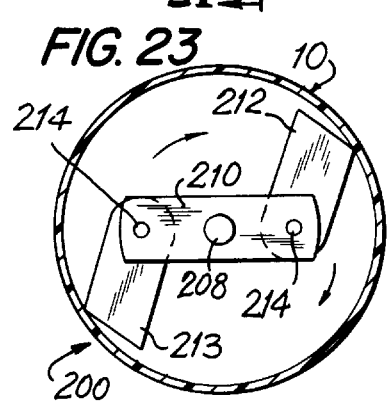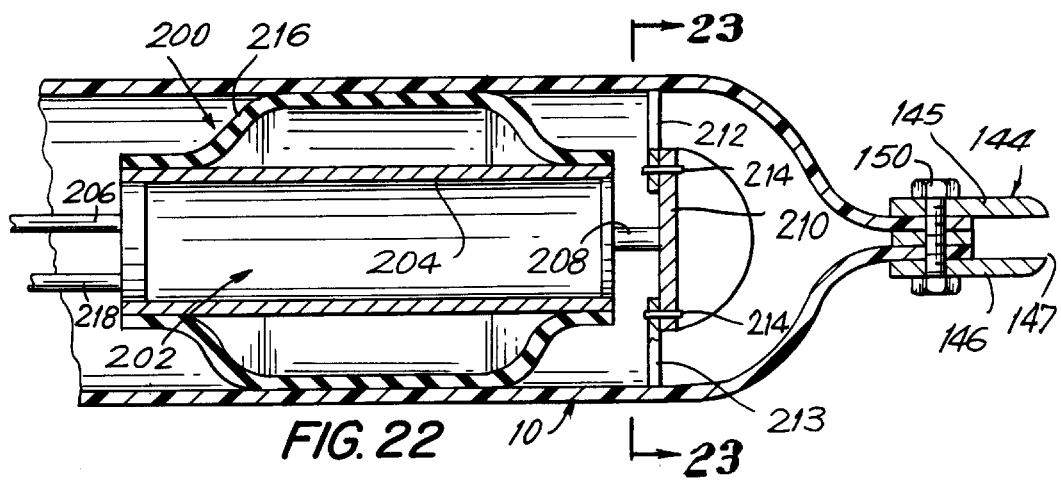

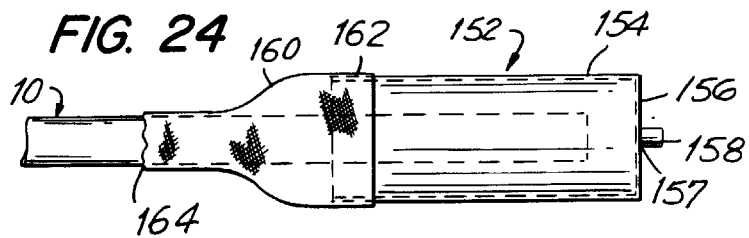
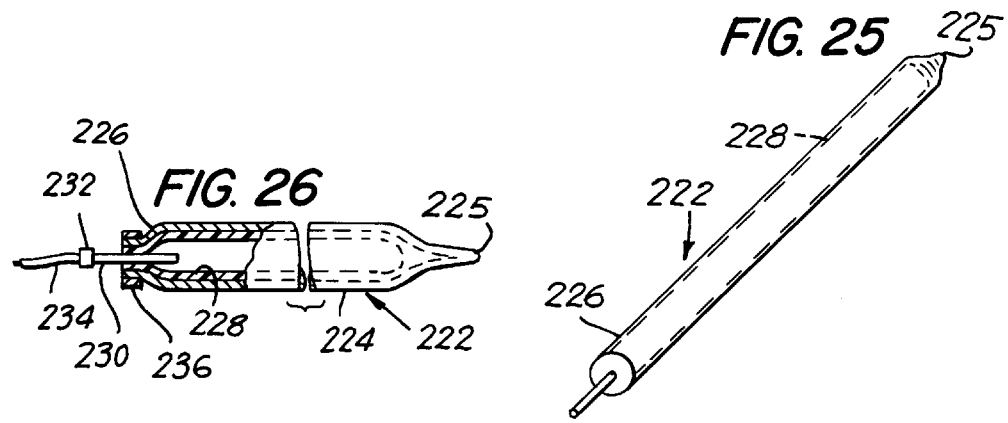
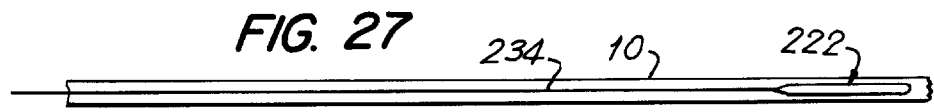
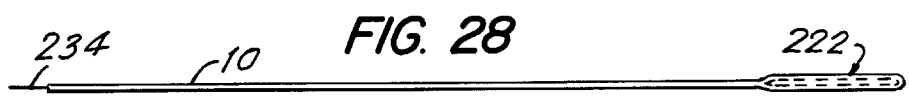
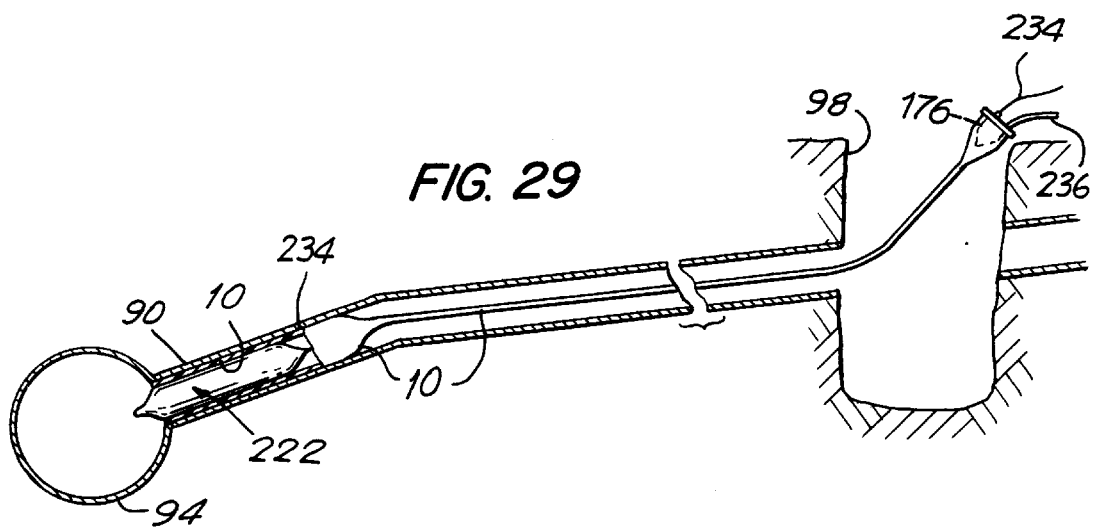

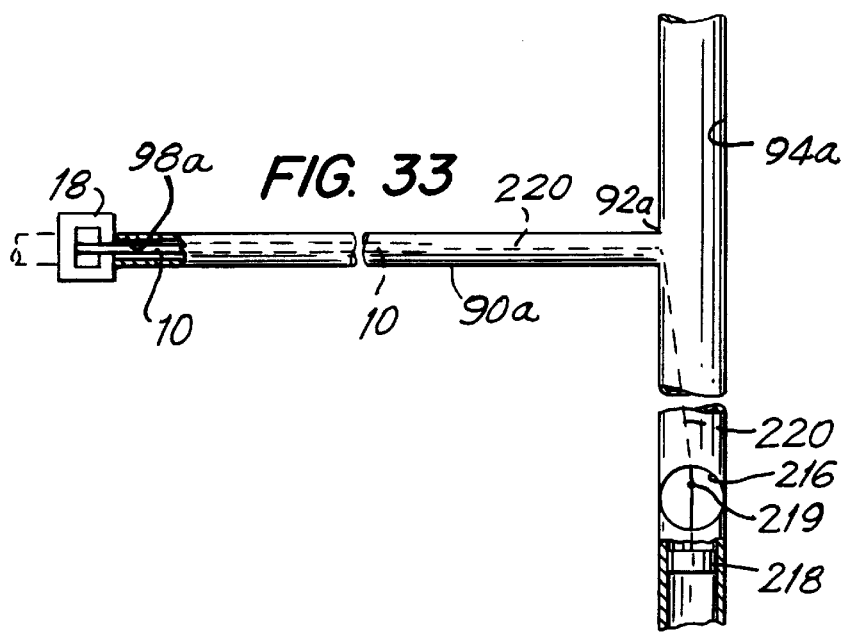
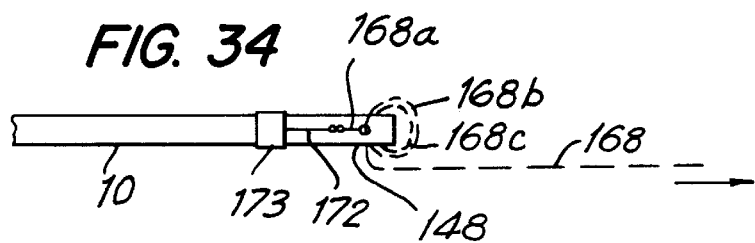
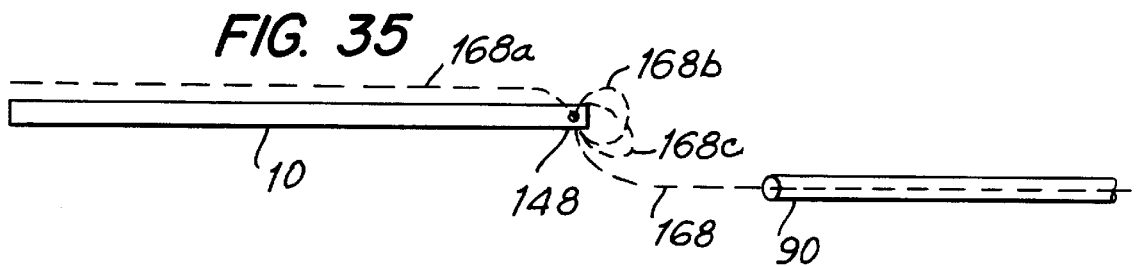
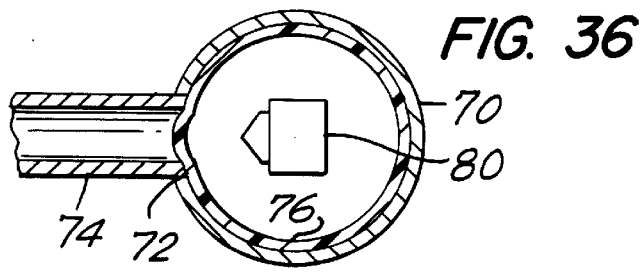

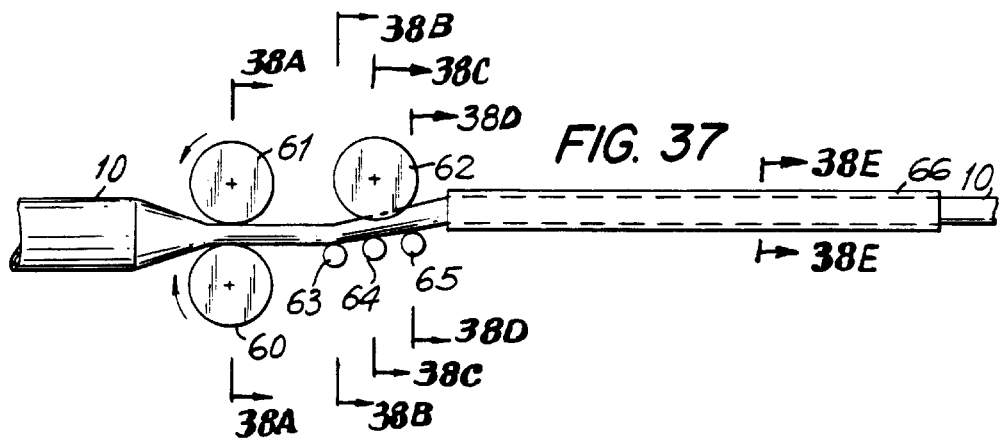
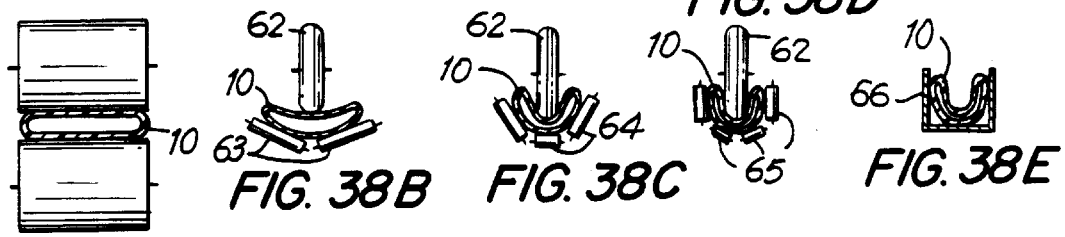
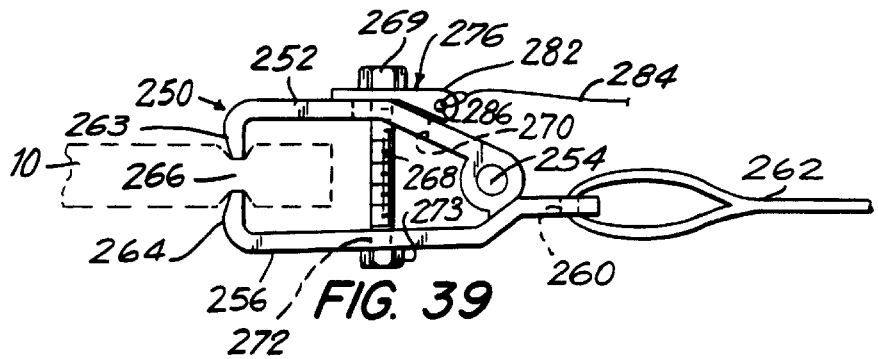
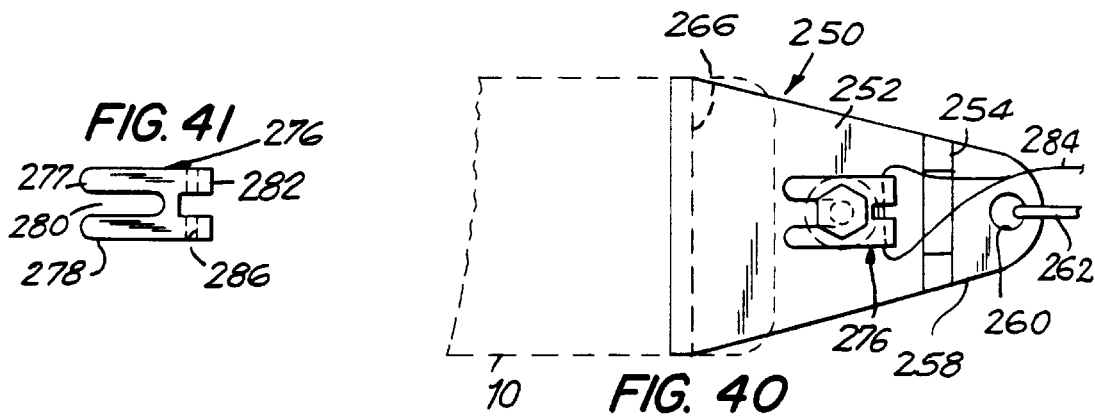

REPLACEMENT PIPE FOR INSTALLATION IN AN EXISTING CONDUIT

REFERENCE TO RELATED APPLICATIONS

This is a continuation of application Ser. No. 08/010,522, filed Jan. 25, 1993, now abandoned which is a continuation of Ser. No. 07/808,305, filed Dec. 16, 1991, now abandoned, which is a continuation of application Ser. No. 07/180,904, filed on Apr. 13, 1988, for REPLACEMENT PIPE FOR INSTALLATION IN AN EXISTING CONDUIT, and now abandoned, which application is a continuation-in-part of application Ser. No. 76,973 filed Jul. 28, 1987, now U.S. Pat. No. 4,867,921, which in turn is a continuation of application Ser. No. 846,322, filed Mar. 31, 1986 and now abandoned.

BACKGROUND OF THE INVENTION

The present invention relates to improvements in methods and apparatus for installing a replacement pipeline section inside an existing underground conduit such as a pipeline section in need of repair or replacement. The present invention is particularly concerned with the installation of a replacement pipeline section within building sewers intersecting sewer mains, within other lateral pipelines, intersecting main pipelines, within pipeline sections that may include curves and abrupt bends, and within still other pipeline sections which are intersected by building sewers, the connections of laterals which would be difficult to locate after a new pipeline section is installed within the existing pipeline section.

Various processes and apparatuses have been suggested for repairing underground pipelines such as sewer lines and the like, with the existing pipeline remaining in place underground, by installing within the existing pipe a flexible membrane or liner of plastic or by inserting into the existing pipe a new plastic pipe.

In one known process, pipes are lined with a flexible plastic such as polyethylene. According to this process the liner is installed through insertion pits at intervals along the pipeline, making the process expensive.

According to another process, shown in, for example, U.S. Pat. Nos. 3,927,164 and 4,064,211 a flexible tube is turned inside out as it is inflated and blown into a pipeline section from one end of the section. This process is expensive because it requires special equipment, extensive heating and expensive materials.

The above mentioned processes and most others use a flexible or semi-flexible liner which is not capable of withstanding any appreciable external hydrostatic or earth pressures. Thus the existing pipe may not be properly repaired since if any part of it is broken away, the liner can possibly collapse from external pressure of any magnitude, such as pressures, for example, which exceed about 4 pounds per square inch.

Both Thomas et al U.S. Pat No. 4,394,202 and Harper et al U.S. Pat. No. 2,794,758 also disclose processes of inserting flexible tubing into an existing pipeline as a lining membrane for that pipeline. Thomas discloses a method of attaching the flexible tubing to the existing pipeline using an expandable short section of adhesive-coated rigid plastic. Both the Thomas and Harper processes have the same drawbacks as previously mentioned with respect to other prior processes using flexible membrane material in that they lack the necessary hoop strength to withstand external earth and hydraulic pressures.

Others have suggested inserting a rigid tube inside the existing pipeline in need of repair. For example, in the published British application No. 2,084,686 an oversized round rigid plastic tube is flattened or otherwise reduced at the job site and then inserted cold and rigid into the existing pipeline through a large excavation at a manhole. After insertion, the plastic tube is expanded using heat and internal pressure. The plastic tube is expanded against the existing pipe.

According to British Patent No. 1,580,438, an existing underground pipe is lined with a plastic liner tube made of a plastic material such as polyethylene or polypropylene having a plastic memory. The liner tube is manufactured in an out-of-round "U" shape to fit inside the existing pipe, then inserted in its out-of-round shape into the existing pipe, and then expanded against the existing pipe under heat and pressure to a round condition.

The published EPC Patent Application No. 0,000,576 suggests inserting a semi-rigid plastic tube insert inside an existing pipe. The semi-rigid plastic tube has sufficient hoop strength to withstand all or at least part of the external pressures that may be imposed upon it.

a. Repair of Crooked Pipelines and Pipelines With Access at Only One End

Most of the foregoing and other known prior art processes employing rigid or semi-rigid tubes for insertion in an existing underground pipe have a common drawback: because of their rigidity or near rigidity they must be inserted in straight or nearly straight existing pipelines. This means, for example, with respect to underground sewer lines, such known processes are limited to use in sewer mains because they usually have straight pipeline sections between manholes. Most if not all of such known processes are not suitable for use in repairing the numerous building sewers that extend from the sewer mains to buildings. Frequently such laterals have curves or bends which a rigid or semi-rigid plastic pipe will not negotiate. Also, such laterals are normally not accessed by manholes at either end and therefore known lining or replacement pipe installation methods requiring manhole or other access at both ends are overly expensive. With most known underground replacement pipe installation processes, large excavations must be made at one end of the lateral to be relined or repaired to provide room for insertion of the straight rigid plastic replacement pipe. Such a large excavation adjacent to a building serviced by the lateral or at the other end where the lateral intersects the main is often impractical and usually expensive.

Furthermore, most known processes of relining or repairing existing underground pipelines require access to the pipeline section to be repaired at both ends of the section. This is not possible with a lateral, which by definition intersects a main line at a point that is usually not accessed by a manhole.

For the foregoing reasons, the known underground pipeline relining and repair processes are simply not applicable to building sewers.

b. Repairing Sewer Mains

Another disadvantage in using known processes of repairing and relining existing pipeline sections intersected by building sewer lines using straight rigid or semi-rigid tubing is that once the tubing is in place in the existing pipeline section, it is very difficult to locate the exact positions where the service laterals intersect the main pipeline so that access openings can be cut in the replacement tubing to access the service laterals. This is especially true if the replacement tubing has sufficient thickness and therefore sufficient hoop strength to itself withstand typical hydraulic and earth pressures.

For the foregoing reasons, there is a need for improved methods, apparatus and tooling that would enable the repair of existing underlying pipeline sections, and especially building sewers and other pipeline sections having bends and curves, and pipeline sections that cannot be readily accessed from both ends of the pipeline section to be repaired.

Accordingly, primary objectives of the present invention are to provide the following:

1. A new and improved replacement pipeline product for installation in an existing underground conduit that is especially suitable for use in repairing and replacing existing building sewer lines that are not straight and main lines intersected by building sewers;
2. A new and improved method of manufacturing a repair and replacement pipeline product especially suitable for installation in existing underground conduits that are not straight or are intersected by lateral service lines;
3. A method of installing a new or replacement pipeline section in an existing underground conduit, and especially one that is not straight or that is intersected by building sewer lines;
4. Apparatus and tooling for manufacturing a replacement pipeline product as aforesaid;
5. Apparatus and tooling for installing a pipeline product as aforesaid in an existing underground conduit, and especially such a conduit that is not straight or that is intersected by lateral service lines; and
6. Apparatus and tooling for reforming a new or replacement thermoplastic pipe section installed in an existing underground conduit, and especially a building sewer, after the new or replacement pipe section has been inserted in a folded condition, by reforming it to a stable rounded shape within the existing conduit.

SUMMARY OF THE INVENTION

The present invention is a new and improved repair and replacement pipeline product especially suited for installation in an existing underground conduit such as a building sewer with bends and curves, and a series of closely interrelated methods, apparatus and tooling for manufacturing the product, installing the product in an existing conduit whether straight or curved, and reforming the product to a rounded shape after it has been inserted into the existing conduit in a collapsed folded shape. The product, processes, apparatuses and tooling of the present invention are especially intended for use in installing the product in building sewers and other existing underground conduits having access from only one end of the conduit or having curves or bends or which are intersected by laterals.

According to one aspect of the invention, a replacement pipeline product is a thermoplastic material such as PVC, extruded and cooled in the first instance to a unique folded and flattened shape so that it retains a folded memory when reheated, so that it can be readily spooled for storage and use, so that it is of a reduced cross sectional size for ready insertion in an existing underground conduit, so that it can be inserted without excavation or damage to the plastic material into deep pipelines through manholes, cleanouts or other small vertical openings, and around sharp bends, and so that, despite its flattened folded condition, a hot fluid can be passed through it for reheating its entire length.

According to another aspect of the invention, the aforesaid plastic pipe product is installed in an existing curved lateral, for example, by reheating the plastic pipe to a pliable state, then pulling the hot pliable folded plastic pipe into the existing lateral with a pull cable and either a pulley arrangement anchored temporarily at the intersection of the lateral and the main, or with a cable winch from the nearest manhole in the main. The folded installed pipe is then heated throughout its length by passing a hot fluid through it, plugging or restricting its leading end, and injecting a fluid, such as air, under pressure into the other end to reform and expand the pipe to a rounded shape. Then, while continuing to apply internal pressure to the reformed rounded pipe, it is allowed to cool and thereby cure in its rounded shape.

According to another aspect of the invention, various means are provided for plugging or restricting the leading end of the plastic pipe for enabling the passage of a hot fluid therethrough while folded and yet enabling the expansion and reforming of the folded pipe to a round shape through the application of an internal fluid pressure.

According to another aspect of the invention, means are provided for capping or sealing an inlet end of the folded pipe for enabling internal fluid pressurization of the folded pipe when inserted into an existing underground pipeline.

According to another aspect of the invention, a unique pulley-and-cable device is provided that can be pushed through a service lateral to its intersection with a main pipeline and temporarily anchored there by maintaining tension on both ends of the cable. One end of the cable is anchored to the leading end of the folded pipeline to be installed; then the opposite end of the cable is pulled to draw the folded plastic pipe into the existing lateral while in a heated pliable condition.

According to another aspect of the invention, various means are provided for heating the opposite ends and various other portions of the plastic pipe product for enabling the reworking of selected portions of the pipe for clamping, inserting plugs, or rendering the entire length of the pipe sufficiently pliable for insertion in an existing conduit that is not straight.

The foregoing and other objects, features and advantages of the present invention will become more apparent from the following detailed description which proceeds with reference to the accompanying drawings.

BRIEF DESCRIPTION OF DRAWINGS

FIG. 1 is a cross-sectional view of conventional thermoplastic pipe, such as PVC pipe used in accordance with the invention in its expanded rounded condition;

FIG. 2 is a perspective view of the thermoplastic pipe of FIG. 1 and apparatus for reducing the pipe from its round condition to a collapsed and folded condition for storage on a spool;

FIG. 3 is a cross-sectional view of the thermoplastic pipe of FIG. 2 after it has been folded as taken along the line 3—3 of FIG. 2;

FIG. 4 is a diagrammatic view showing a process of installing the folded and spooled thermoplastic pipe of FIGS. 2 and 3 within a sewer main from a manhole, the folded thermoplastic pipe being stored on a roll and being reheated for installation in the underground pipe to be rebuilt;

FIG. 5 is a diagrammatic view, in section, showing a detail of apparatus for expanding the folded thermoplastic pipe of FIGS. 2 and 3 and rounding it after it has been inserted in the existing main pipeline as shown in FIG. 4;

FIG. 6 is a diagrammatic view, in section, showing an alternative structure for expanding and rounding the folded thermoplastic pipe after its insertion in an existing conduit.

FIG. 7 is a schematic sectional view through a typical building sewer extending from a building serviced to a main sewer line and illustrating a method of installing the thermoplastic pipe in an existing building sewer in accordance with the invention;

FIG. 8 is a sectional view through a preferred form of the thermoplastic pipe of FIG. 1 when folded for installation in an existing underground conduit;

FIG. 9 is a schematic elevational view of an apparatus for manufacturing the thermoplastic pipe of FIG. 1 in a folded form as shown in FIG. 8;

FIG. 10 is an elevational view of the calibrator of the apparatus of FIG. 9 on an enlarged scale as used to manufacture the thermoplastic pipe in the form shown in FIG. 8;

FIG. 11 is an elevational view of a single calibration plate of the calibrator of FIG. 10 as viewed from the line 11—11 of FIG. 10;

FIG. 12 is a plan view of a folded end portion of the thermoplastic pipe of FIG. 8 with an attached end clamping means for use in pulling the pipe into an existing conduit and for restricting the pipe end to enable internal pressurization of the pipe for expansion;

FIG. 13 is a sectional view taken along the line 13—13 of FIG. 12

FIG. 14 is a somewhat schematic plan view of a cable-and-pulley apparatus of the invention, also shown in FIG. 7, for pulling the folded thermoplastic pipe of FIG. 8 into a service lateral, the apparatus being shown in its operative position;

FIG. 15 is a view similar to FIG. 14 but with the apparatus of FIG. 14 in a collapsed condition for insertion in a service lateral;

FIG. 16 is a somewhat schematic side elevational view of the apparatus of FIGS. 14 and 15;

FIG. 17 is a side elevational view of a plugging tool used in plugging an end of a length of the thermoplastic pipe shown in FIG. 8 after the end has been rounded, for use in transmitting fluid, heat and fluid pressure to the interior of the thermoplastic pipe;

FIG. 18 is a leading end elevational view of the tool of FIG. 17;

FIG. 19 is a view of an end of the thermoplastic pipe with the plugging tool of FIGS. 17 and 18 inserted in the pipe and clamped in place with a chain clamping means;

FIG. 20 is a view of the chain clamping means of FIG. 19 before its application to the pipe and plug of FIG. 19;

FIG. 21 is a cross-sectional view taken along the line 21—21 of FIG. 19 showing the chain clamping tool of FIGS. 19 and 20 clamping the thermoplastic pipe end to the plugging tool of FIGS. 17–19;

FIG. 22 is a somewhat schematic longitudinal sectional view through a leading end portion of the thermoplastic pipe of FIG. 8 with the end clamp of FIGS. 12 and 13 applied to the pipe end and with the remainder of the pipe expanded and rounded, and with a cutting tool in accordance with the invention inserted in the rounding pipe end portion for severing the clamped end from the remainder of the pipe;

FIG. 23 is a sectional view of the pipe and cutting tool of FIG. 22 taken along the line 23—23 of FIG. 22;

FIG. 24 is a somewhat schematic side elevational view of an end heater apparatus used in heating an end portion of the thermoplastic pipe for reworking the end portion, the heater tool being shown installed on a folded end portion of the thermoplastic pipe of FIG. 8;

FIG. 25 is a perspective view of an inflatable end plugging tool used in plugging or restricting the end portion of the thermoplastic pipe instead of the end clamping means of FIGS. 12 and 13 to enable expansion and rounding of the folded thermoplastic pipe;

FIG. 26 is a foreshortened elevational view, partly in section, of the inflatable pipe of FIG. 25;

FIG. 27 is a schematic view illustrating installation of the inflatable plugging tool of FIGS. 25 and 26 in the thermoplastic pipe when in an expanded and rounded condition;

FIG. 28 is a schematic view similar to FIG. 27 but showing the pipe of FIG. 27 after it has been refolded with the inflatable plug in a deflated condition inside;

FIG. 29 is a schematic view illustrating the use of the inflatable plugging tool of FIGS. 25 and 26 during installation of the thermoplastic pipe in a service lateral;

FIG. 33 is a schematic view of a main pipeline section and an intersecting service lateral pipeline illustrating an alternative method of pulling the thermoplastic pipe of FIG. 8 into a service lateral to be repaired;

FIG. 34 is a schematic view of an end portion of the folded thermoplastic pipe of FIG. 8 illustrating one method of releasing the pull cable from the leading end of the pipe after it has been inserted in an underground conduit;

FIG. 35 is a schematic view similar to FIG. 34 illustrating still another method of releasing the pull cable from the thermoplastic pipe after it has been inserted into an existing underground conduit;

FIG. 36 is a sectional view through the intersection of a main pipeline and a service lateral pipeline after the thermoplastic pipe of FIG. 8 has been installed and expanded within the main pipeline to be repaired, and illustrating a method of locating and cutting an opening through the newly installed thermoplastic pipe to reopen communication between the service lateral and the main pipeline;

FIG. 37 is a schematic side elevational view illustrating and method and apparatus for folding a thermoplastic pipe that has been manufactured round, for insertion in an existing underground conduit;

FIGS. 38A–E are schematic sectional views taken, respectively, along the lines 38A—38A through 38E—38E of FIG. 37;

FIG. 39 is a somewhat schematic side elevational view of a releasable end clamp and attached pull cable and release line, for use in clamping the leading end of the folded pipe of FIG. 8 during its installation;

FIG. 40 is a top plan view of the end clamp of FIG. 39; and

FIG. 41 is a top plan view of the release wedge portion of the clamp of FIG. 39.

DETAILED DESCRIPTION OF PREFERRED EMBODIMENTS

Figure 30:
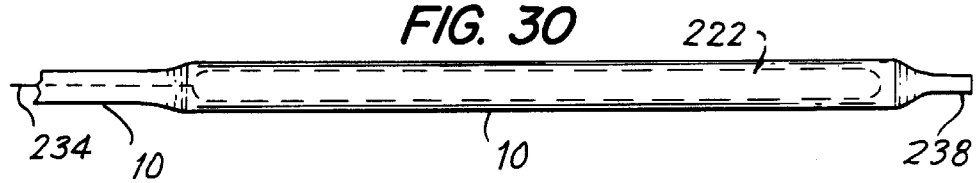
FIG. 30 is a schematic view illustrating another use of the inflatable plugging tool of FIGS. 25 and 26.

Repair Of Sewer Mains And The Like

With reference first to FIG. 1, the numeral 10 designates a type of pipe which is used to rebuild, repair or replace underground pipeline sections such as sewer pipes or the like according to the present invention. A characteristic of the pipe 10 is that it is formed of a thermoplastic material such as PVC, and more particularly a material that is normally rigid and thick-walled so as to have sufficient hoop strength to withstand external earth and hydraulic pressures to which it might be exposed when underground. Yet such thermoplastic pipe can be made pliable upon heating to temperatures of, for example, 200° F. or above in the case of PVC pipe. A characteristic of the pipe is that it is structurally rigid at typical ambient above-ground and underground temperatures but becomes pliable and workable to various shapes when heated or reheated. Another characteristic of such thermoplastic material is that it has a memory; that is, if it is manufactured in a particular shape such as a rounded tubular shape and then later heated and flattened or folded and then cooled to hardened in its folded shape, and then reheated without restraint, it will tend to return to its original rounded tubular shape. Conversely, if the pipe is manufactured initially in, for example, a collapsed and folded shape, as shown for example in FIGS. 3 and 8, then later heated and expanded under internal pressure to a rounded shape and then cooled and cured in its rounded shape, it will tend to return to its original folded shape if subsequently reheated without restraint. This memory aspect of the thermoplastic pipe is used to advantage in certain aspects of the present invention.

A conventional and readily available pipe of the type useful in practicing the present invention is a polyvinyl chloride (PVC) pipe with standard dimension ratios (outside diameter/wall thickness) in the range of 13 to 65 presently available for underground pipelines such as drain lines, water lines, etc.

Although in the most preferred embodiment of the present invention the thermoplastic pipe is manufactured in a folded shape as shown in FIG. 8 in the manner described with respect to the apparatus of FIGS. 9–11, at least certain aspects of the invention can also be practiced using a thermoplastic pipe manufactured in a tubular or round shape. FIG. 2 illustrates apparatus 11 for reshaping the conventional PVC pipe 10 that has been manufactured in a round shape. FIG. 3 illustrates a cross-section of the pipe 10 after it has been reshaped by flattening and folding using the apparatus of FIG. 2. More particularly, the PVC pipe 10 is heated in any conventional manner, such as by a heating means 11*a*, which may be a thermostatically controlled steam box or a housing containing thermostatically controlled electric heating elements. By passing the original round pipe 10 through the heating box 11*a*, the pipe is heated to a temperature sufficient to make the pipe plastic or pliable. It is then flattened or preferably folded, in a folding apparatus 11 to reduce its overall cross-sectional dimension so that it is capable of being pulled readily into an underground conduit having the same or only slightly larger inside diameter than the original outside diameter of the thermoplastic pipe. The thermoplastic pipe of reduced folded dimension is illustrated at 10*a* in FIG. 3.

Although the unit 11 in FIG. 2 illustrates schematically a pipe folding means, a practical pipe folding apparatus and method are illustrated in more detail with respect to the apparatus of FIGS. 37 and 38A–E. There it will be seen that the round pipe 10, after passing through the heater 11*a*, is first flattened by a pair of opposed flattening rollers 60, 61 and then passed beneath a folding wheel 62 while supported progressively by three different sets of folding rollers 63, 64, 65. The pair of folding rollers 63 are arranged in cooperation with folding wheel 62 to begin folding pipe 10 into a U shape. Then the three folding rollers 64 continue the folding process by being arranged in a semi-U shape for cooperation with folding wheel 62. Finally, the set of four folding rollers 65 are arranged in a U shape for cooperation with the folding wheel 62 to complete the folding of pipe 10 into a U shape. Thereafter the folded pipe is passed through a restraining form 66 while it is cooled to cure the pipe in its U shape. From form 66 the folded pipe can be either stored in predetermined lengths or passed through a steam tube to be reheated and made pliable for insertion directly into an existing conduit.

Alternatively, after the flattening process and before folding, the pipe can be spooled in its flat condition in the hot box 18 shown in FIG. 4. Then the flat, spooled pipe can be reheated in the hot box at the job site, and then pulled from the hot box and folded as previously described just before insertion into the pipe to be rebuilt.

In some applications it may also be possible to install the thermoplastic pipe into an existing pipe in a flattened condition, particularly if the thermoplastic pipe in its rounded condition is of substantially smaller outside diameter than the inside diameter of the pipeline to be repaired. However, under most conditions, it is preferred that the thermoplastic pipe be installed in an existing pipeline in a longitudinally folded form as shown in either FIG. 3, FIG. 8, or in FIG. 38E. However, of all the folded forms, the form of FIG. 8 is preferred for reasons explained below.

As previously mentioned, the thermoplastic pipe when manufactured in a round shape has a memory tending to return it to its round shape when it is reheated after folding. Thus when if it is necessary to reheat the folded pipe to rended it pliable for installation in an existing pipeline, the pipe will tend to return to its round shape, perhaps prematurely, unless restrained. It is for this reason, primarily, that it is preferred that the thermoplastic pipe be manufactured in the first instance in a desired folded shape. Then when the folded pipe is reheated to make it pliable for insertion in an existing pipeline, the pipe will retain its folded shape until fully inserted into the existing pipeline and ready for reforming into a round shape.

Regardless of whether the thermoplastic pipe is manufactured in a round or folded shape, the pipe should be in a folded shape when it is ready for insertion in the existing conduit. It is also preferred that the thermoplastic pipe be spooled while heated and therefore made pliable on a storage spool such as spool 12 shown in FIG. 4.

The spool 12 of folded thermoplastic pipe is stored in a housing or "hot box" 18 equipped with a thermostatically controlled heater 24 for heating the interior of the hot box and thus the spool 12 to render the folded pipe material 10*a* pliable when desired. Preferably hot box 18 is also equipped with an air circulation system 19 to prevent heat stratification within the hot box, and thereby to ensure that the spool of folded pipe will be uniformly heated. Hot box 18 is preferably mounted for portability and is shown mounted on the flat bed of a truck 20 for transportation to a job site. A smaller form of the hot box may be wheel-mounted and manually moved for use in the servicing small inaccessible pipelines such as building sewers. In either case, either power operated or manual means are provided for rotating the spool 12 for winding material on the spool or unwinding it from the spool. Hot box 18 is equipped with an access door 21 and may also be equipped with a downspout 22 and a roller 23 for facilitating insertion of the folded thermoplastic pipe into an underground pipeline through a vertical access opening such as the manhole 16 of the existing sewer main 14.

Method of Repairing Sewer Main

According to one aspect of the invention, the hot box 18 is transported to an opening at a job site, such as the manhole 16, at an underground pipe section such as the sewer main 14 to be repaired. The end of the reduced pipe 10a is connected to a pull line 26 made available from an adjacent opening in the existing pipeline, such as another manhole (not shown), and connected by clamp means 28 to the free or leading end of the new pipe. The new pipe is made pliable by heating spool 12 in the hot box 18 via heater 24. The pull line 26 is then activated by, for example, a winch at the next manhole downstream from manhole 16 to pull the pliable folded pipe 10a from spool 12 through spout 22 and about spout roller 23 into existing pipe 14 to the next manhole. After inserting the folded new pipe, it is heated and expanded to a round or substantially round form to provide a pipe which will set up into a thick-walled, rigid form having sufficient hoop strength to withstand external hydraulic and earth pressures.

FIG. 5 illustrates one manner of expanding the reduced dimension pipe after it has been pulled into the original pipe to be rebuilt or replaced. According to such method, a pair of plugs 30 and 32 are inserted in the opposite ends of the folded pipe when at least the ends are in a heated pliable condition. The plug 30 is installed at a trailing end of the new pipe section which is at the insertion end of the existing pipeline. The plug 32 is installed at the leading or pull-line end of the new pipe after disconnection of the pull line. Each of plugs 30 and 32 is equipped with peripheral expanding gasket members 34 arranged for releasible sealing engagement with the original pipe 14 and the new pipe 10a. Gasket members 34 are inflated via pressure lines 36, such as air pressure lines, leading to control means (not shown) above ground. Plug 30 has an inlet conduit 38 therethrough for introducing into the new pipe an expanding medium such as live steam or hot water. Such conduit is equipped with a suitable control valve 40 as well as a pressure gage 42 and a relief valve 44. Plug 32 has a discharge conduit 46 communicating with the area between the two plugs and suitably valved at 48.

The newly installed folded pipe, with the plugs inserted at its opposite ends, is then internally heated by passing live steam through the small passages provided at the folds of the new pipe evident in FIG. 8. Valve 48 at the downstream end is open so that the entire length of the new pipe is heated. Valve 48 is then closed while steam under pressure continues to be introduced through plug 30 to pressurize the folded pipe, causing it to reform and expand to a rounded shape. If the new pipe is manufactured folded, it should be cooled or allowed to cool after attaining its round shape while maintaining internal pressure, such as cool air pressure, so that the pipe cures in its round shape. This last step is not necessary if the pipe is manufactured in a round shape unless the pipe is expanded or stretched beyond its original diameter during the reforming process.

If no internal passages are provided in the folded new pipe such as would be the case if the new pipe is folded absolutely flat as shown in FIG. 3, the new pipe would have to be heated externally, such as by passing live steam through the existing pipe, before plugs 30 and 32 are inserted into the ends of the new pipe. Then with the new pipe heated throughout its length, plugs 30 and 32 could be easily inserted into its opposite ends, valve 48 would be closed, and live steam or hot water would be introduced through plug 30 to expand the folded pipe and reform it into a round shape.

FIG. 6 shows another type of apparatus for expanding the reduced pipe. Such apparatus comprises a mandrel 50 having heating means 52 therein capable of heating the new pipe into a pliable state. Mandrel 52 is connected to a pull cable 54 or other means for drawing it through the original pipe. Upon proper heating of the mandrel and through application of tension to the pull cable, the mandrel is pulled through the original pipe, expanding the new pipe to the desired diameter. Obviously with this method, pull cable 54 would be inserted into the new pipe before the new pipe is folded for insertion into the existing pipeline.

A third method of heating, rounding and expanding the new pipe involves flushing hot water or steam down the existing pipe to be repaired alongside the installed but still folded new pipe until the desired temperature is achieved at the downstream end. Then the new pipe is pressurized with hot water or steam and expanded under pressure to a round shape and to the desired diameter.

EXAMPLE

In a specific pipe reconstruction process, conventional PVC pipe is obtained which is one-half inch, plus or minus, smaller in outside diameter than the inside diameter of the pipe to be rebuilt. The PVC pipe has standard dimension ratios of wall thickness to outside diameter as noted previously. The PVC tubing is heated to at least 200–210° F. and reduced to the shape shown in FIG. 3, FIG. 8 or FIG. 38E. The folded pipe is then stored on large spools so that it can be trucked to the job site. During installation in an existing pipe or conduit underground, the new pipe is again heated, preferably in hot box 18, so as to be made pliable and capable of being pulled readily generally vertically down through a deep manhole and then generally horizontally through the existing conduit. Once installed in the existing conduit section the folded pipe is plugged, heated and rounded. If desired it may also be expanded beyond its original or design rounded diameter to fit snugly against the existing pipeline section.

Method Of Locating Building Sewer Connections

An advantage of expanding the newly installed thermoplastic pipe beyond its original design diameter is illustrated with respect to FIG. 36, where the existing pipeline section to be repaired is intersected by at least one building sewer line or other service lateral. In FIG. 36, the main pipeline 70 is intersected at 72 by a service lateral 74 such as a building sewer line. When the new thermoplastic pipe is installed in the main 70 and rounded and expanded or stretched beyond its original rounded design diameter to snugly engage the inside wall of existing main 70, a bulge or dimple 76 is formed at the opening or intersection 72 of the service lateral into the main. This bulge 76 in effect is an indicator of the precise location of the opening of the service lateral into the main. By passing a television camera through the main, the exact location of the bulge or dimple, and thus the service lateral opening, can be determined. Thereafter a remotely controlled cutting tool 78 can be passed along the main to the exact location of the bulge and used to cut the bulge 76 from the new pipe 80, thereby reopening access of the service lateral 74 to the main.

Rounding and expanding, or stretching, of the newly installed thermoplastic pipe is achieved by the methods previously described or as described hereinafter with respect to additional embodiments.

Preferred Form of Folded Pipe

Although the flattened and folded thermoplastic pipes of FIGS. 3 and 38E are suitable for use in the installation processes described, the preferred form of such folded pipe is shown in FIG. 8. The thermoplastic pipe 10 of FIG. 8 is manufactured in substantially the folded form shown. It is generally a collapsed tube folded along a generally curved bulbous longitudinal fold 82 into a pair of overlying legs, including a long leg 83 and a shorter leg 84. The long leg 83 terminates at a curved or bulbous free end 85 so as to define a small longitudinal passage 86 through the folded pipe. The shorter leg 84 also terminates in a curved or bulbous free end 87 which also defines a longitudinal passage 88 through the pipe. Furthermore the gently folded portion 82 defines a passage 89 along the interior of the fold from one end of the pipe to the other.

The bulbous fold and leg ends as described are important in preventing the folded portions of the pipe from splitting when folded, which might otherwise be the case if the pipe is folded flat in the manner shown in FIG. 3, especially if the pipe is thick-walled. Passages 86, 88 and 89 are also important in enabling steam or other hot fluid to pass full-length through the folded pipe for reheating and thus reworking after the folded pipe is installed in an existing underground conduit. Without such access to the interior of the folds, reheating would be a long, slow process and very difficult to achieve.

The folded form of pipe of FIG. 8 is especially suitable for use as replacement pipe in the repair of building sewers such as a building sewer line 90 shown in FIG. 7 leading from an intersection 92 with a main pipeline 94 into a building 96 to be serviced. Installation of a replacement pipe in such building sewer lines presents special problems because of the nature of such lines. First, such laterals present difficult access problems because they often run under lawns, trees and shrubs and are not accessed by manholes. Digging up the existing lateral in need of repair would thus be very expensive. In inserting a new lateral into an existing lateral underground, access is usually practical only from a single small vertical excavation adjacent to the building, as indicated at 98 in FIG. 7. Such an exacavation leaves little room for maneuvering or for a large amount of equipment.

Second, building sewers are usually of much smaller diameter than mains and frequently have sharp curves or bends, unlike mains which are usually straight from manhole to manhole. For example, the building sewer 90 has a bend at 100, making it impossible to insert into the existing lateral a straight rigid pipe. In FIG. 7 the building sewer 90, accessed by the vertical excavation 98 adjacent to building 96, extends beneath a lawn 102 to the main 94 at a substantial depth below a street 104. The processes and apparatuses about to be described are particularly suited for solving the unique problems of installing a replacement lateral pipe in an existing lateral pipe underground from a single small, generally vertical access opening. Such methods and apparatuses utilize the manufactured form of folded thermoplastic pipe shown in FIG. 8.

Method and Apparatus for Manufacturing Thermoplastic Pipe in Folded Form

Referring to FIGS. 9, 10 and 11, the folded thermoplastic pipe of FIG. 8 is manufactured using a conventional plastic pipe extruder 106 extruding into a vacuum box 108. Puller means 110, comprising a series of opposed pinch rolls 111, 112, downstream of the vacuum box, pulls the extruded and formed material from the vacuum box under tension and feeds it into a steam tube 114 for reheating to a pliable condition so that the resulting folded pipe can be wound in its folded form on a storage spool 116 which would typically be located in the hot box 18 of FIG. 4.

A die 118 and pin 120 are located at the extruder outlet. There is a gap 121 of between about 12 and 24 inches between the downstream end of the die 118 and the inlet to the vacuum box 108.

The vacuum box is divided internally by partitions 122, 123 into three sections. All three sections are filled with water to a level 124 within the box. The first or upstream section of the box is connected to a source 125 of vacuum. Although the entire vacuum box is under a negative pressure because of such connection, a maximum negative pressure is in the upstream section of the box. Calibrator means 126 are provided in the first section of the vacuum box. The calibrator means forms and maintains the extruded plastic material in its desired folded shape as the material is cooled and hardened. The water within the vacuum box serves the cooling function, and the vacuum supplied to the box cooperates with the calibration means to maintain the plastic material in its desired folded form until, through cooling, it is capable of maintaining such form without restraint.

Referring especially to FIGS. 10 and 11, the calibration means includes a series of calibration plates 128 arranged in spaced-apart relationship and assembled together by assembly rods 130 and spaced apart by spacers 132 between plates on the rods. The rods are threaded at their opposite ends and secured by nuts 134. The calibration plates 128 closer to the inlet end of the calibrator are spaced more closely together than those further downstream because of the greater plasticity and flowability of the plastic at the inlet end portion and therefore the greater need to maintain the shape of the extrusion in that portion of the calibrator. Optionally, the calibrator also includes a central tube 136 with orifices 137 for transmitting cooling water to and between the plates for more rapid cooling of the plastic material.

Referring to FIG. 11, each calibration plate 128 includes a precision cut opening 138 of the exact outline shape and outer size of the folded pipe formed and maintained in the calibration plates. Each plate 128 of the calibrator has exactly the same size and shape of opening. Comparing FIGS. 8 and 11, it will be noted that the opening 138 of the calibration plate includes a short leg 138a corresponding to the short leg 84 of the folded pipe and a long leg 138b corresponding to the long leg 83 of the pipe as well as a rounded fold portion 138c corresponding to the longitudinal rounded fold 82 of the pipe.

In manufacturing the pipe of FIG. 8, raw plastic mix such as polyvinyl chloride is fed into the extruder 106 through an infeed funnel 107 where the material is heated to a high temperature of, for example, about 360° F. and then extruded through the die 118 where the very hot plastic material encounters the pin 120. The die and pin are sized to form the plastic into the desired final size and shape of the tube desired. The plastic material is fed across the gap 121 into the first section of the vacuum box 108 and through the calibrator plates. The plates form and maintain the plastic material in the shape and size determined by the calibration plate openings 138.

When the plastic material first enters the calibrator it is very hot and rather fluid, and therefore the calibration plates 128 are very close together at this point to maintain the desired shape. The vacuum within the box holds the plastic against the outer periphery of the opening 138 as the cooling water cools the plastic material. If desired, compressed air injected from a source 140 into pin 120 can be passed down through the interior passages 86, 88, 89 of the folded plastic form to ensure that the plastic does not completely collapse and to maintain the tubular form of the folded pipe. By the time the plastic material reaches the downstream end of calibrator 126, it is cooled substantially and is capable of maintaining its own shape under tension induced by pulling rolls 110. Such rolls pull the folded plastic from the vacuum box in a continuous strip. From the calibration plates, the strip travels through the second and third chambers of the vacuum box, where it is progressively cured. By the time the strip 10 leaves the vacuum box it is cool, rigid and substantially in the form shown in FIG. 8. Puller 110, by pulling the strip or stream of material from the extruder under tension, controls the wall thickness and other dimensional parameters of the folded pipe.

From puller 110 the folded strip is fed through steam tube 114 into which a source of steam 115 is fed through an inlet opening 117 to reheat the strip to a pliable condition so that it can be spooled on storage spool 116.

The number and spacing of calibrator plates used in the calibrator is a function of the extrusion speed as determined by the puller and of the desired wall thickness of the finished pipe.

As previously mentioned, the spool 116 of stored folded pipe 10 may be installed in the hot box 18 shown in FIG. 4 for transportation to and use at a job site.

Method, Apparatus and Tooling for Installing Thermoplastic Pipe in Lateral

FIG. 7 not only illustrates a sewer lateral as previously described, but also a method, apparatus and tooling for inserting the folded thermoplastic pipe at FIG. 8 into the lateral. First, a vertical excavation 98 must be dug, preferably as close to building 96 serviced by the lateral 90 as possible to break through and provide access to existing lateral 90.

Then the length of the lateral to be repaired or replaced can be determined by inserting a flexible fiberglass rod into the lateral at the excavation and feeding the rod through the lateral until it intersects main 94. When this occurs, the length of the rod within the lateral can be marked at the access opening and then the rod withdrawn and measured to determine the length of plastic pipe 10 needed for the job. When the lengths of a series of laterals to be repaired is known, the folded pipe 10 can be precut to correspond with such lengths, either at the manufacturing plant or at some other location remote from the job site. Then such precut lengths can be transported to the job sites for installation.

Alternatively, the lengths required can be cut at the job site from the spool 116 or 12 (FIG. 4) within the hot box 18 transported to the job site. If the excavations for the laterals to be repaired are not accessible to the truck 20 on which the hot box 18 is mounted, the necessary length of plastic pipe 10 can be stored on other, smaller spools within smaller wheel-mounted hot boxes (not shown) wheeled to the respective excavations. A smaller "mini hot box" 140 is shown in FIG. 7 enclosing a spool 142 of folded pipe 10.

Alternatively, rather than premeasuring and precutting the required lengths of folded plastic pipe 10 to lengths corresponding to the lengths of the laterals to be repaired, the folded pipe 10 can be simply heated within the hot box 140 and fed into the existing lateral until the new folded pipe reaches the intersection with main 94, and then cut off at the spool.

Also, if the folded plastic pipe 10 is precut to length at the factory, it can be transported in its precut lengths to the various job sites and there heated for insertion into the existing lateral in a steam tube like the steam tube 114 shown in FIG. 9. The steam tube may be made of canvas or metal or equivalent materials, with flexible fabric or equivalent ends which can be tied around the folded plastic pipe to keep the steam inside the steam tube. Such tubes are lightweight for easy transportation to a job site and can be 20 feet long or longer. For field use, a canvas steam tube is preferred over the metal tube because of weight considerations.

If the sewer lateral is straight and its access opening at the excavation close enough to the surface, or the excavation large enough, it may be possible to insert the necessary length of folded plastic pipe 10 into the existing lateral simply by pushing the new pipe into the existing pipe until the leading end reaches the main. However, oftentimes this will not be possible because of the necessity of the new pipe to negotiate a bend at the excavation or along the lateral, or both. In such cases, it is necessary to heat the normally rigid folded plastic pipe to render it longitudinally pliable to negotiate the bends and to pull the new folded pipe into the lateral rather than push it. Pulling the flexible folded plastic pipe into the existing lateral, without an access opening at the main end of the lateral, presents special problems addressed by the present invention.

Pulling the New Lateral Into the Existing Lateral From The Access Opening

One method of inserting the new lateral into the existing lateral by pulling involves the use of a pull cable attached to the leading end of the new lateral. The cable passes about a pulley at the connection of the lateral to the main, and then leads back to the entrance to the lateral. By applying a pulling force to the pull cable from the access opening at the excavation 98, the new pipe can be pulled through the full length of the existing lateral. This method involves the use of special tooling.

First the leading end of the new lateral must be clamped closed to restrict the size of the through passages 86, 88, 89 as shown in FIG. 8 to enable internal pressurization of the folded pipe after it is inserted into the existing lateral while still enabling hot fluid to pass through the folded pipe so that it can be heated throughout its length and thereby rendered pliable for expansion and rounding. To accomplish this restriction and end clamping, an end clamping means as shown in FIGS. 12 and 13 is used. A side view of the end clamping means is also shown in FIG. 22. With reference to these three FIGS., the end clamping means 144 includes a pair of rigid metal plates. The plates include a top plate 145 and an opposed bottom plate 146. Both plates have fowardly projecting nose portions 147 with aligned pull cable connecting holes 148 extending therethrough. Another pair of aligned holes 149 extend through the bottom and top plates rearwardly of the cable hole 148 for receiving a clamping bolt 150. Bolt 150 also extends through aligned drilled holes 151 through the folded plastic pipe 10.

To install end clamp 144 on the leading end of folded plastic pipe 10 the leading end of the pipe is heated to render it pliable in, for example, an end heater 152 shown in FIG. 24. End heater 152 includes a thin-walled rigid pipe 154 closed at one end by an end plate 156 having a central inlet port 157 with a steam hose connection 158. The opposite end of the heater includes a flexible canvas or other suitable fabric wrap 160 banded to pipe 154 at connecting band 162. The free end of wrap 160 can be tied or banded about the folded plastic pipe 10 in such a way that steam is allowed to escape at the connection 164 of the wrap with the pipe so that the entire end portion of the pipe is heated to a desired temperature upon injection of steam into the pipe through connection 158. The length of pipe 152 may be in approximately two feet for most purposes although it can be longer and shorter depending on the application.

After the leading end of pipe 10 is rendered pliable, the plates of end clamp 144 are applied to the end of the pipe, and bolt 150 is extended through bolt holes 151 and tightened so that the opposed plates 145, 146 squeeze an intermediate portion of the folded pipe to a more flattened condition to reduce the size of passages 86, 87, 89 at the end of the folded pipe. It should be noted that the widths of clamping plates 145, 146 are substantially narrower than the overall width of the folded pipe 10 so that passages 89 at the fold and 86 at the end of the long leg do not become completely closed upon application of clamping force to the folded pipe. Thus when the clamp is applied, fluid can still pass completely through the clamped end of the pipe, yet the passages are small enough such that a buildup of internal pressure within the folded pipe can be achieved to expand and round the pipe.

The described end heater is also useful for other purposes as will soon become apparent from the following description.

Releasable End Clamp

Another form of end clamp, which can be used instead of end clamp 144, is a releasable end clamp 250 shown in FIGS. 39–41. Clamp 144 has the disadvantage of not being removable from the leading end of pipe 10 when inserted into a blind conduit without cutting off the clamped end of the conduit using a special remotely activated cutting tool as shown in FIGS. 22 and 23 and described hereinafter. However, releasable end clamp 250 can be remotely released from the clamped end of the new pipe when desired and pulled by cable from the existing conduit.

Releasable clamp 250 includes an upper jaw 252 pivoted at 254 to a lower jaw 256. Lower jaw 256 includes a leading end projection 258 with a pull cable hole 260 extending therethrough for attaching a pull cable 262. Jaws 252, 256 have gripping ends 263, 264 for gripping and compressing when hot and pliable, a leading end portion 266 of folded plastic pipe 10.

A bolt 268 extends through a large opening 270, larger than the head 269 of the bolt, and through an aligned smaller bolt hole 272 in lower jaw 256. Bolt hole 272 is smaller than the nut 273 and head 269 of bolt 268. A bifurcated release wedge member 276 has parallel arms 277, 278 defining a slot 280 and joined to a vertically wedge-shaped body 282. A flexible release cable or cord 284 is attached to the body 282 by passing it through body hole 286.

Wedge member 276 is designed to be wedged between the head 269 of bolt 268 and the upper surface of upper jaw 252 with arms 277, 278 extending beneath the head and slot 280 receiving the shank of the bolt. Thus bolt head 269 is drawn against arms 277, 278, rather than through large upper jaw opening 270, when the bolt is tightened to clamp jaw ends 263,264 against pipe 10.

To release the clamp from the new pipe after the pipe has been pulled into the existing sewer lateral using pull cable 262, and after the new pipe has been rounded except for the clamped end, release cable 284 is pulled. This pulls wedge member 250 from beneath bolt head 269 (or nut 273 if the nut end of the bolt is above the top jaw), allowing the bolt head to drop through the large opening 270 in the upper jaw 256, and thereby allowing the jaws to open to release the pipe end. The wedge member and the clamp can be pulled from the lateral or main using their respective pull cables.

Pulley-and-Cable Frog

Another tool used in pulling the new folded lateral into the existing lateral from the access opening 98 is a pulley-and-cable means referred to as a "frog", as shown in FIGS. 14–16. The frog 152 includes a cable pulley wheel 154 rotatably mounted within a pulley housing 156 on an axle 157. Attached to opposite sides of the open rear end of the pulley housing are a pair of angular legs 158. Each leg includes a forward leg section 158*a* and an integral rearward or trailing leg section 158*b*. Trailing rearward from the trailing leg sections 158*b* are a pair of flexible steel leg guide bands 160 curled inward at their rear ends 161. The pivot connections 162 of the legs 158 to housing 156 are spring-loaded to urge the legs outward as shown in FIG. 14. However, the legs can be pivoted inward to the positions shown in FIG. 15 to allow the legs and thus the entire assembly to travel through the lateral.

A pair of generally triangular-shaped arms 164 are pivoted to the junctures of forward and rearward leg sections 158*a*, 158*b* at spring-loaded pivot connections 166. The spring-loaded connections 166 urge the arms 164 to their extended positions shown in FIG. 14 normal to rearward leg sections 158*b* when they are in their extended positions of FIG. 14. However, the arms 164 may be collapsed against spring pressure to their collapsed positions shown in FIG. 15, again to allow the frog to travel through a lateral to its destination. A pull cable 168, with both ends leading back to access opening 98, is trained about pulley wheel 154.

With its pull cable 168 attached, but with both ends of the cable leading back to access opening 98, the frog is inserted into the existing lateral and pushed through it using a flexible fiberglass push rod (not shown). When the frog reaches the intersection of the lateral with the main, and with the housing 156 and its connected pulley pushed into the main, and also with the forward legs 158*a* entering the main, arms 164 spring outward from their positions shown in FIG. 15 to their open positions shown in FIG. 14. In the open position of the legs, rearward leg sections 158*b* and their connected leg bands 160 press against the inner wall of the existing lateral. At this point, both ends of pull cable 168 are pulled to anchor the frog firmly to the junction of the lateral and main.

While continuing to apply tension to the pull cable to keep the frog anchored in place, one end of the pull cable is attached to end clamp 144 (FIGS. 12–13) or releasable end clamp 250 (FIGS. 39–41). The other end of the cable, still at access opening 98, is pulled, pulling the heated, pliable folded plastic pipe 10 through the lateral and around bend 100 until the leading end of the folded pipe 10 reaches the intersection of the lateral and main at frog 152. Pulling force can be applied to the cable 168 to accomplish this either by hand or by using a hand-or power-operated winch 170 (FIG. 7) at access opening 98. Because of the triangular shape of arms 164, pulling tension applied to cable 168 prevents the frog from flipping up or down.

After the new folded plastic pipe reaches the frog in the main, the cable connection to the pipe end clamp is released, and an end of the cable is pulled through the pulley, dropping the frog into the main. The cable is then pulled out of the service line from the entrance opening, and the frog can be retrieved from the main at a later time using conventional retrieval methods. At this point the folded plastic pipe 10 is fully inserted into the lateral to be repaired, with its clamped leading end at the main. The folded plastic pipe is now ready to be reheated and expanded to a rounded shape in the existing service lateral.

Before discussing the expansion and rounding process as applied to service laterals, mention should be made of the method and means for releasing pull cable 168 from end clamp 144 so that the cable can be pulled through the frog. This can be accomplished in several ways as shown, for example, in FIGS. 34 and 35.

FIG. 34 illustrates what is referred to as a break-away cable release. In this method, a "slack" end 168a of the pull cable 168 is attached to a relatively low-strength breakable string or cable 172 which is in turn taped at 173 to a leading portion of folded pipe 10 to be inserted into the existing lateral. From its slack end, pull cable 168 is loosely looped through cable hole 148 in the end clamp as indicated by loose loops 168b, 168c, and then trained through the pulley of the frog. The pulling end of the cable remains at the access opening to the lateral. If an end clamp is not used, the cable hole 148 may be drilled directly through the folded leading end of the plastic pipe. As the winch at the access opening pulls the cable through the frog to winch the folded new pipe into the existing lateral, string 172 holds moderate tension on the slack end 168a of the cable. When the leading end of the folded new pipe reaches the frog, the pulling end of the cable is sharply jerked, breaking string 172 and releasing the slack end 168a of the cable through cable hole 148 so that the cable can be retrieved.

FIG. 35 illustrates a similar cable release method referred to as the hand-held cable release. In this method, the slack end portion of cable 168 is again looped twice loosely though the cable hole 148 at the leading end of the folded new pipe 10 to form the double loops 168b, 168c. Then the pull cable 168 is lead through the existing lateral 90 to the frog and back to the entrance opening. The slack portion 168a of the cable must be longer than the length of the new pipe 10 to be inserted. As the winch pulls the new pipe into the existing lateral, a moderate tension is held on slack end 168a of the cable, allowing the folded new pipe to be pulled into the lateral. When the new pipe is properly inserted in the existing lateral, slack end 168a of the cable is released at the entrance opening, allowing it to be pulled free from the leading end of the newly inserted pipe through cable opening 148.

Method and Apparatus for Expanding and Rounding Folded Pipe Within Lateral

With the folded new pipe in place within the existing lateral, it is ready to be expanded and rounded to replace the existing lateral as a functioning service lateral. At this point the leading end of folded new pipe 10 is already restricted by an end clamp 144 or 250 so that the folded pipe can be pressurized internally by fluid and yet allow hot steam or other fluid to pass through it. This enables the entire internal length of the folded pipe to be heated to a pliable condition for expansion. Of course, at this point, the trailing end of the newly inserted folded pipe is also capped to enable the introduction of hot steam or other fluid into the pipe for heating and expansion. Such a capping means, or plug, is shown in FIGS. 17–21.

A generally conically-shaped plug, referred to as a "torpedo plug" 176 includes a generally conical leading portion 178 having an orifice 180 at its leading end. Conical portion 178 extends rearwardly to a short cylindrical portion 182 which is capped by a rear end plate 184. Plate 184 includes an inlet port 186 and a hose connection 188 for coupling a steam or hot water supply hose so that hot fluids under pressure can be introduced into the interior of the folded pipe. Other hose connections can also be provided through end plate 184, such as an air hose connection, for expanding the pipe using air pressure or maintaining air pressure in the expanded pipe when curing the same in its expanded, rounded condition.

With the trailing end of folded pipe 10 heated, as by using end heater 152 previously described, to make it pliable, the conical portion of torpedo plug 176 is driven into the trailing end of pipe 10, as shown in FIG. 19, until end cap 184 abuts the end edge of the new pipe, thus expanding the end of the new pipe to a rounded shape conforming to the outer diameter of cylindrical plug portion 182. An adjustable chain clamp 190 is used to clamp the expanded end portion of the new pipe to the cylindrical portion 182 of the torpedo plug to seal the pipe to the plug.

Details of the chain clamp 190 are shown in FIGS. 20 and 21. The chain clamp includes a clamping plate 192 having a curved pipe-engaging surface 193. The plate's convexly curved outer surface mounts a device 194 between which a nut member 195 is pivoted. Nut member 195 receives a threaded rod 196 having a wrenching end 197. A clamping chain 198 is connected to the opposite end of the rod. The chain is preferably a transmission chain or bicycle chain or the like. The chain is adapted for adjustable connection to an anchor post 199 on the outer surface of clamping plate 192.

With the end of pipe 10 heated and pliable, and torpedo plug 176 inserted in such end, clamping plate 192 is placed on the rounded pipe end, and chain 198 is wrapped around the cylindrical pipe end, cinched up as tight as possible by hand, and then anchored to anchor post 199. Clamping pressure is then applied by rotating threaded rod 196 in a direction to shorten the effective length of clamping chain 198 using a wrenching tool applied to wrenching end 197 of the rod. It is important that the clamp be easily tightened because the plastic pipe tends to deform when heated, and the clamp must be tightened in place during the process of heating and rounding of the new pipe.

With the torpedo plug clamped in place at the trailing end of the newly inserted pipe, a steam hose is connected to the plug connection 188. Hot steam is forced through the length of the folded pipe, more specifically through the small passages through it, allowing the full length of the pipe to be heated. At the same time, the restriction imposed by the end clamp at the leading end of the folded pipe enables the pipe to be pressurized internally up to about 25 PSI. As the pipe becomes heated and pressurized, it expands and rounds to its cylindrical shape throughout its length, except at its clamped end portion.

When the new pipe is expanded and rounded to its desired dimension, usually against the inner wall of the existing lateral, the plastic pipe is allowed to cool while maintaining internal pressure through, for example, the introduction of air under pressure, thereby enabling the new pipe to cure in its newly rounded form. When the new pipe is cured, the chain clamp is released from its trailing end and the torpedo plug is removed.

Removing the Clamped End of the New Pipe

The next step is to remove the end clamp and still folded and clamped leading end portion of the new pipe from the remaining rounded portion of such pipe. This is accomplished by cutting the clamped and folded leading end from the expanded and rounded new pipe as shown with reference to FIGS. 22 and 23.

In FIGS. 22 and 23 a severing means is shown for cutting off the folded and clamped leading end of the expanded and rounded pipe 10 in the existing pipe. The severing means comprises a power operated cutting tool 200. The cutting tool includes a small high speed electric or air motor 202 housed within a cylindrical motor housing 204 of substantially smaller diameter than the inside diameter of the rounded plastic pipe 10. A flexible air hose or electric power cord 206 supplies power to the motor 202 from a remote source at the entrance opening to the existing service lateral. A motor drive shaft 208 mounts a rotor 210 to which a pair of cutting or flailing blades 212, 213 are pivotally attached at pivot connections 214 adjacent the outer ends of the rotor.

Motor housing 204 is encased in an inflatable rubber sleeve 216 which, when expanded, centers and anchors the cutting unit in place within the rounded plastic pipe. A flexible air supply hose 218 supplies air under pressure for inflating sleeve 216.

Although the flail blades 212, 213 shown are steel, they could also be made of chain or cable. They are designed to extend outwardly under centrifugal force as rotor 210 rotates, to flail and cut plastic pipe 10.

In use, cutting unit 200 is pushed down through the new plastic pipe 10 after the pipe has been installed and rounded. The pushing can be accomplished with a flexible fiberglass rod and with rubber sleeve 216 deflated. The cutter is pushed into the existing lateral until it reaches the collapsed and clamped leading end. At this point, sleeve 216 is inflated to anchor and center the cutting unit within the rounded plastic pipe. With the sleeve inflated, motor 202 is energized by supplying it with power through air hose or electric cord 206. The motor rotates rotor 210 to activate flail blades 212, 213 until the blades cut off the clamped and folded end of the plastic pipe. The severed end falls into the main and can be retrieved later by conventional methods.

After the leading end of the pipe is cut off, sleeve 216 is deflated and the cutting unit is recovered from the rounded plastic pipe simply by pulling on the air hose 218 and power cord 206 from the entrance end of the new pipe. The new lateral is now installed in the existing lateral, and after it is connected up with the portion of the lateral leading into building 96 (FIG. 7) it is ready for service.

Alternative Methods and Apparatus for Installing and Expanding the New Pipe in an Existing Lateral FIG. 33 illustrates an alternative method of pulling the folded plastic pipe 10 through an access opening 98a into an existing lateral 90a intersecting a main pipeline 94a at an intersection 92a. At some distance from intersection 92a the main 94a has a manhole 216 for access into the main. A cable winch 218 is stationed at manhole 216. The leading end of a pull cable 220 is introduced into the existing lateral 90a at access opening 98a and pushed down the lateral to intersection 92a by a flexible fiberglass rod the leading end of which is equipped with a gripper for gripping the leading end of the pull cable.

The leading end of the push rod is also curved so that when it reaches the intersection, it can be directed around the sharp corner into the main. At this point the push rod continues to push the pull cable 220 through the main, as shown at 220a, until the leading end of the pull cable reaches manhole 216. The leading end of the pull cable is attached to the winch cable at 219. The trailing end of the pull cable 220, still at access opening 98a to lateral 90a, is connected to the leading end of folded pipe 10 using one of the cable release methods previously described. The new pipe, after being heated in, for example, hot box 18 to be made pliable, is pulled into existing lateral 90a by winching cable 220 using winch 218 at manhole 216. The pulling continues until the leading end of new pipe 10 reaches intersection 92a. Then pull cable 220 is released from the leading end of the new pipe using one of the previously described techniques. The new pipe is now ready for expansion and rounding within the existing lateral 90a using either the previously described method of rounding or another method to be described.

Inflatable Plug Method of Rounding Pipe

Another method and apparatus for expanding the newly installed plastic pipe within an existing service lateral are shown in FIGS. 25–29. This method is known as the inflatable plug method. The inflatable plug 222 used in this method is shown in FIGS. 25 and 26. It is used instead of the end clamp 144 (FIGS. 12–13) or end clamp 250 (FIGS. 39–41) to seal off or restrict the inaccessible leading end of the new plastic pipe so that such pipe can be pressurized, rounded and expanded. The plug is designed to be capable of holding at least 25 PSI of air pressure, expand to an outer diameter the size of the inside diameter of the rounded new pipe, but not burst if unrestrained by the new pipe. The plug should also be designed to withstand a temperature in excess of 200° F.

The inflatable plug could be constructed of a single layer of flexible material if a suitable material could be found to meet the foregoing specifications. However, no such suitable material has yet been found. Therefore a two-layer construction of the plug is presently used. The plug is composed of an outer canvas or other fabric tube 224 folded, shut and stitched closed at its leading end 225. The outer tube 224 has an expanded diameter corresponding to the desired inside diameter of the new pipe when rounded. The trailing end 226 of the canvas tube remains open. An expandable rubber inner tube or bladder 228 is placed inside the canvas tube. The total length of the plug can vary from about one foot to 20 feet depending on the application. The trailing ends of the outer canvas tube and inner rubber tube are gathered about a pipe stem 230 providing an air hose connection 232 for an air or steam supply hose 234 for supplying fluid under pressure to the interior of the inner tube. The trailing ends of the outer and inner tubes are gathered about pipe stem 230 and tightly banded by a band clamp 236 to prevent leakage of pressurized fluid from the inner tube.

The inflatable plug as described is typically used in installing and rounding new service laterals so that the previously described end clamps and end cutters need not be used. A typical method of using the inflatable plug is as follows:

The required length of folded plastic pipe for a given existing service lateral is heated and rounded in the shop using, for example, the steam tube previously described. The hose 234 for pressurizing the plug is inserted through the length of the rounded plastic pipe with the inflatable plug attached, until the plug is positioned at the leading end portion of the rounded plastic pipe.

At this point, the precut length of rounded plastic pipe is reheated, and refolded with the deflated plug and connected air hose folded inside for field use. FIG. 27 shows the insertion of the air hose and connected deflated plug 222 into the rounded plastic pipe 10. FIG. 28 illustrates the refolding of the pipe 10 with the deflated plug 222 and hose 234 inside the folded pipe.

At the job site, the plastic pipe is heated and inserted while folded and flexible into the lateral to be rebuilt. When completely inserted, the folded plastic pipe is heated with the plug still deflated by passing steam through the pipe. When the full length of the installed plastic pipe has been heated, the plug is inflated via air hose 234 to expand the plug and thus the still hot, pliable leading end portion of the plastic pipe 10 surrounding the plug to completely plug the leading end portion of the plastic pipe. After the plug is inflated, the plastic pipe upstream of the plug is pressurized by, for example, compressed air, rounded and expanded, with the air being supplied by a hose 236 leading into the torpedo plug 176 at the trailing end of the new pipe at the access opening 98.

After the new plastic pipe has been completely rounded and expanded to a desired diameter within existing lateral 90, and then allowed to cool, plug 222 is deflated and pulled out of the newly rounded pipe 10 by its air hose 234. The newly installed plastic lateral is now ready for service.

Other Methods of Using the Inflatable Plug

Figure 31:
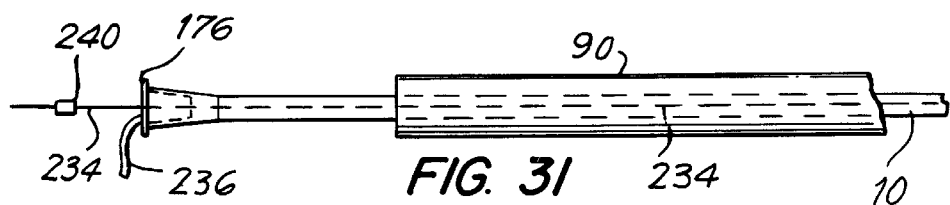
FIG. 31 is a schematic view further illustrating the use of the inflatable plugging tool of FIGS. 25 and 26 in accordance with the process illustrated in FIG. 30.
Figure 32:
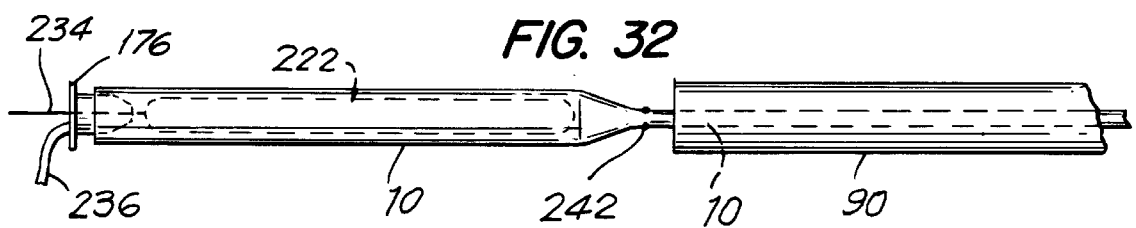
FIG. 32 is a schematic view illustrating still another use of the inflatable plugging tool of FIGS. 25 and 26 to expand and round the folded thermoplastic pipe after it has been inserted into an existing underground conduit.

FIGS. 30–32 illustrate some other methods of using the inflatable plug just described.

A slight variation on the method illustrated in FIGS. 27–29 is the use of the inflatable plug as a sliding plug during the pipe rounding process. According to this variation, referring to FIG. 30, inflatable plug 222 and its air hose is installed in prerounded plastic pipe 10 and folded with the pipe as before, but with the plug positioned about six inches or so from leading end 238 of the pipe, allowing such leading end to be folded as compactly as possible for ease of insertion into the existing lateral. The folded pipe 10, with deflated plug 222 inside, is installed folded as before into the existing lateral. The trailing end of the new pipe is plugged by a torpedo plug 176, with air hose 234 extending through a seal in the torpedo plug.

With inflatable plug 222 deflated, the folded pipe is steam heated internally throughout its length to render it pliable. Air hose 234, where it extends from the torpedo plug 176, is pulled tight and a clamp 240 is placed on the hose 12 inches or so behind the rear end of the torpedo plug. When the folded new pipe is hot, the inflatable plug is inflated. In addition the folded new pipe between the inflated plug 222 and the torpedo plug 176 is pressurized with compressed air injected through the torpedo plug via air line 236. The pressurization of the new pipe forces the inflated plug 222 to slide toward leading end 238 of the new pipe until it is stopped by the abutment of clamp 240 against the rear end of the torpedo plug. At this point the leading end, like the rest of the newly installed pipe, will be completely rounded. The inflated plug 222 is now deflated and pulled from the newly installed pipe.

FIG. 32 illustrates another method of using the inflatable plug 222 to plug, round and expand the new pipe within an existing lateral or other conduit having access from only one end.

According to this method, the new pipe is inserted into the lateral in a folded condition using one of the previously described insertion techniques and without the leading end clamp or inflatable plug to seal or restrict its leading or downstream end. However, at least about 10 feet of extra length of the folded plastic pipe is left exposed at the access end to the existing lateral. The folded pipe is steam heated internally to render it pliable throughout its length. When hot, an exterior clamp 242 is applied to the folded pipe about 10 feet downstream of torpedo plug 176. Then the upper ten feet or so of plastic pipe between the clamp and torpedo plug is rounded by injecting steam from line 236 through the torpedo plug into the upper ten feet of the folded pipe. The rounded ten feet of pipe is then allowed to cool in its rounded condition.

The torpedo plug 176 is now removed and inflatable plug 222 is inserted in at least a partially inflated condition for ease of insertion into the rounded section of the new pipe. Torpedo plug 176 is reinserted into the end of the rounded section of new pipe with air hose 234 from the inflatable plug extending through it. Now clamp 242 is removed from the new pipe, and the inflatable plug 222 is deflated. The new pipe is steam heated internally again throughout its length to again render it pliable. When the new pipe is hot, inflatable plug 222 is partially inflated. The internal pressure within the new pipe, which may be steam or air pressure, is increased, and the partially inflated plug 222 is propelled through the new pipe, which at this point is partially unfolded and partially rounded. When the inflatable plug 222 reaches the downstream or leading end of the new pipe, it is fully inflated to plug the end. The new pipe is now fluid pressurized, fully rounded, and cooled and thus cured in its rounded condition. When cured, inflated plug 222 is deflated and pulled from the fully rounded pipe.

Remote End Pipe Seal

A method and means are also provided for sealing the space between the new rounded pipe and the existing pipe wherever such pipes intersect another opening, whether a manhole or another pipe. A typical pipe intersection would be at the downstream end of a building sewer line where it enters a sewer main.

The seal is simply a compressible rubber sleeve encircling the intersecting end of the folded new pipe. It is typically ¼ to ⅛ inch thick but can be of any reasonable thickness. It is typically 12 to 24 inches long but can be of any desired length.

When the leading end of the folded new pipe is installed and accessible, such as at a manhole, the sleeve can be slipped over the folded end of the new pipe before such end is rounded. Then, during rounding of the pipe end, the sleeve is rounded also. The new pipe is expanded during the rounding process until the rubber sleeve is compressed tightly between the new pipe and the existing pipe to form the fluid-tight seal.

For sealing the remote and inaccessible downstream ends of building sewer lines, a different method is used. An adhesive-backed rubber sleeve is used. The leading end of the folded new pipe is heated, unfolded and rounded before insertion into the existing pipe. The adhesive-backed sleeve is applied to the rounded end, and the end is refolded with the sleeve attached. Then the folded new pipe is inserted into the existing pipe, using one of the previously described processes.

Use of the previously described expandable plug is the preferred method of rounding and expanding the remote end to be sealed. With such plug, the expansion and hence the seal is more complete and more certain than with the other described methods.

Method of Removing Installed Thermoplastic Replacement Pipe From An Existing Underground Conduit As previously noted, it is preferred that the thermoplastic pipe 10 be manufactured in the folded shape shown in FIG. 8. Having been first cooled and cured in such folded shape, the thermoplastic pipe retains a memory for such shape which tends to return it to such folded shape whenever it is reheated and unrestrained. This memory for its folded shape can be utilized to advantage when removing a damaged section of such pipe from an existing underground conduit.

To remove the damaged thermoplastic pipe from inside an existing pipeline, the damaged pipe is heated by passing live steam through it and, if possible, around the outside of it. When hot, the damaged pipe section to be removed collapses to its original folded shape. This collapse and refolding can be accelerated by connecting a vacuum pump to the interior of the pipe to lower its internal pressure. When collapsed and folded, the hot plastic pipe can be pulled from the existing pipeline by a cable winch with the pull cable attached to an accessible end of the collapsed pipe.

Heating and Forming Thermoplastic Pipe for Insertion

Heating the folded thermoplastic pipe for ease of insertion, especially where bends in the existing pipe or conduit must be negotiated, or the new pipe must be fed down through a small, deep vertical hole, is important. Several methods of heating for insertion have been described including use of a hot box or a long steam tube. Another method is to heat the inside of the existing pipeline into which the thermoplastic pipe is to be inserted. According to this method, a short section of pipe having a steam connection is connected to the trailing end of the existing pipe to be repaired. A canvas closure on the trailing end of the steam pipe section is wrapped around the folded new pipe as it is fed through the steam pipe connection into the existing pipe to heat the new pipe during its insertion. This method can also be used to advantage with the other described heating methods.

The flattened, folded form of the rigid thermoplastic pipe shown in FIGS. 3 and 8 is also important because such form gives the pipe certain attributes unattainable with other pipes that may be collapsed or partially collapsed solely for the purpose of reducing their overall cross sectional dimensions for insertion in an existing pipe. First, the flattened, folded form shown, when heated and pliable, can be stored conveniently and compactly in long or short lengths on a spool. The spool in turn can be used for storage, reheating and feeding the pipe into a conduit.

Second, the form of pipe shown, when heated and pliable, is capable of being inserted into a pipeline around a sharp bend from a small vertical access opening, such as a manhole, and is capable of being installed around sharp bends in the existing pipeline itself. For example, a rigid PVC pipe of a typical wall thickness-to-diameter ratio within the range previously mentioned, when flattened and folded to the unique form shown in FIG. 3 or 8, and heated to a pliable state, will have a ratio of minimum bending radius-to-rounded outside diameter of between one and two. That is, a typical 4-inch diameter rigid PVC pipe, when pliable, flattened and folded as shown in FIG. 3 or 8, can negotiate a curve having a radius of between 4 and 8 inches, depending on wall thickness, without damaging the pipe walls. Such a minimum bending radius is unattainable with other known forms of rigid thermoplastic pipe when in their pliable states.

Third, despite the foregoing attributes when heated and pliable, the folded pipe forms of FIGS. 3 and 8 can be reformed readily to a round shape and cured to render it structurally rigid and sufficiently strong to withstand external earth and hydraulic pressures. Thus the installed thermoplastic pipe of this invention is truly a replacement pipe, not merely a liner for a damaged existing pipe.

Having described the principles of my invention by what are presently several preferred embodiments and variations thereof, it should be apparent to persons skilled in this art that the invention can be modified in various ways without departing from such principles. I claim as my invention the preferred embodiments and all modifications, variations and equivalents coming within the true spirit and scope of the following claims:

I claim:

1. A replacement pipe product in reduced form for insertion in an existing conduit comprising:

a length of pipe of substantially rigid thermoplastic resin material such that the pipe at ambient temperature is rigid and substantially thick-walled so as to withstand external pressures and at a predetermined elevated temperature is pliable, said pipe in reduced form having a flattened and longitudinally folded shape to form two legs, a first leg and a second leg interconnected at a rounded bulbous longitudinal fold portion, the first and second legs of the folded pipe terminating at rounded bulbous free ends defining fluid passages through the interior length of the folded pipe, one said leg being longer than the other such that the bulbous end of the shorter leg nests behind the bulbous end of the longer leg to minimize the overall thickness of the folded pipe.

2. The replacement pipe product of claim 1 wherein the pipe is a polyvinyl chloride (PVC) material.

3. The replacement pipe product of claim 1 wherein the pipe has a memory for such folded shape such that when heated to said elevated temperature it retains its folded shape.

4. The replacement pipe product of claim 3 wherein the pipe is a polyvinyl chloride (PVC) material.

5. A replacement pipe product for insertion into an existing conduit, comprising:

a length of pipe in reduced non-circular cross-sectional form of a thermoplastic resin material which is substantially rigid at ambient temperatures and substantially thick-walled so as to withstand external pressures and is pliable at a predetermined elevated temperature with all cross-sectional dimensions less than the diameter of the pipe when heated and placed in tubular form;

the replacement pipe product having a memory for such reduced non-circular form when heated to elevated temperature to render the product pliable.

6. The replacement pipe product of claim 5, wherein the resin material is polyvinyl chloride.

7. The replacement pipe product of claim 5, wherein the pipe product in reduced form is substantially flattened and longitudinally folded, including first and second legs interconnected at a rounded bulbous longitudinal fold portion.

8. The replacement pipe product of claim 7, wherein the first and second legs of the folded pipe terminate at rounded bulbous free ends defining fluid passages through the length of the interior of the folded pipe.

9. The replacement pipe product of claim 8, wherein one of the legs is longer than the other such that the end of the shorter leg nests behind and adjacent to the end of the longer leg to minimize the overall thickness of the folded pipe.

10. The replacement pipe product of claim 9, wound on a storage spool.

* * * * *